(12) United States Patent
Preston et al.

(10) Patent No.: US 7,164,662 B2
(45) Date of Patent: Jan. 16, 2007

(54) NETWORK DELAY IDENTIFICATION METHOD AND APPARATUS

(75) Inventors: Dan A. Preston, Bainbridge Island, WA (US); Joseph D. Preston, Bainbridge Island, WA (US); Robert Leyendecker, Aloha, OR (US); Wayne Eatherly, Puyallup, WA (US); Rod L. Proctor, Seattle, WA (US)

(73) Assignee: Airbiquity, Inc., Seattle, WA (US)

( * ) Notice: Subject to any disclaimer, the term of this patent is extended or adjusted under 35 U.S.C. 154(b) by 881 days.

(21) Appl. No.: 09/888,085

(22) Filed: Jun. 22, 2001

(65) Prior Publication Data

US 2002/0015424 A1 Feb. 7, 2002

Related U.S. Application Data

(63) Continuation of application No. 09/531,367, filed on Mar. 21, 2000, now Pat. No. 6,690,681, and a continuation-in-part of application No. 09/484,942, filed on Jan. 18, 2000, now Pat. No. 6,771,629, which is a continuation-in-part of application No. 09/230,079, filed as application No. PCT/US98/10317 on May 19, 1998, now Pat. No. 6,144,336.

(60) Provisional application No. 60/116,093, filed on Jan. 15, 1999, provisional application No. 60/055,497, filed on Aug. 12, 1997, provisional application No. 60/048,369, filed on Jun. 3, 1997, provisional application No. 60/048,385, filed on Jun. 3, 1997, provisional application No. 60/047,140, filed on May 20, 1997, provisional application No. 60/047,034, filed on May 19, 1997.

(51) Int. Cl.
  *H04J 3/06* (2006.01)
  *H04L 7/00* (2006.01)
  *H04Q 7/20* (2006.01)

(52) U.S. Cl. ...................... 370/328; 370/350; 370/503; 370/519; 375/355; 455/502

(58) Field of Classification Search ................ 370/503, 370/514, 519, 328, 350; 375/145, 149, 365, 375/355; 455/502
See application file for complete search history.

(56) References Cited

U.S. PATENT DOCUMENTS 4,158,748 A * 6/1979 En ............................. 375/368
4,218,654 A   8/1980 Ogawa et al. ................ 370/97

(Continued)

FOREIGN PATENT DOCUMENTS

WO    WO 98/53573    11/1998

*Primary Examiner*—Alpus H. Hsu
(74) *Attorney, Agent, or Firm*—Stoel Rivers LLP

(57) ABSTRACT

Network delay is determined in order to synchronize a clock in a mobile station with a reference clock. Tone are generated that represent a sequence of bits in a synchronization flag. The tones are sampled beginning at a selected sample start time. The sampled tones are demodulated to identify the bit values in the synchronization flag. The demodulator is synchronized with the sampled tones in the synchronization flag by shifting the sample start time until the samples generate an optimum synchronization value. A reference time is then identified according to the optimum sample start time.

14 Claims, 30 Drawing Sheets

U.S. PATENT DOCUMENTS

| | | | |
|---|---|---|---|
| 4,310,722 A | 1/1982 | Schaible | 179/2 EB |
| 4,368,987 A | 1/1983 | Waters | 368/46 |
| 4,494,211 A | 1/1985 | Schwartz | 364/571 |
| 4,766,589 A * | 8/1988 | Fisher | 370/291 |
| 4,984,238 A * | 1/1991 | Watanabe et al. | 370/509 |
| 5,014,344 A | 5/1991 | Goldberg | 455/51 |
| 5,245,634 A | 9/1993 | Averbuch | 375/108 |
| 5,245,647 A * | 9/1993 | Grouffal et al. | 377/20 |
| 5,365,450 A | 11/1994 | Schuchman et al. | 364/449 |
| 5,379,224 A | 1/1995 | Brown et al. | 364/449 |
| 5,420,592 A | 5/1995 | Johnson | 342/357 |
| 5,438,337 A | 8/1995 | Aguado | 342/357 |
| 5,440,491 A | 8/1995 | Kawano et al. | |
| 5,509,035 A | 4/1996 | Teidemann, Jr. et al. | 375/356 |
| 5,510,797 A | 4/1996 | Abraham et al. | 342/352 |
| 5,663,734 A | 9/1997 | Krasner | 342/357 |
| 5,781,156 A | 7/1998 | Krasner | 342/357 |
| 5,812,087 A | 9/1998 | Krasner | 342/357 |
| 5,838,237 A | 11/1998 | Revell et al. | 340/573 |
| 5,856,986 A * | 1/1999 | Sobey | 714/744 |
| 5,874,914 A | 2/1999 | Krasner | 342/357 |
| 5,917,449 A | 6/1999 | Sanderford et al. | 342/457 |
| 5,930,722 A | 7/1999 | Han et al. | 455/502 |
| 5,933,468 A * | 8/1999 | Kingdon | 375/362 |
| 5,999,124 A | 12/1999 | Sheynblat | 342/357.09 |
| 5,999,126 A | 12/1999 | Ito | 342/357.1 |
| 6,014,376 A * | 1/2000 | Abreu et al. | 370/350 |
| 6,031,489 A | 2/2000 | Wyrwas et al. | 342/357.16 |
| 6,493,338 B1 * | 12/2002 | Preston et al. | 370/352 |
| 6,665,333 B1 * | 12/2003 | McCrady et al. | 375/147 |

* cited by examiner

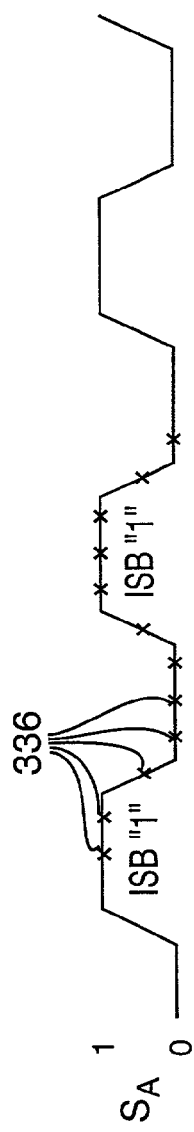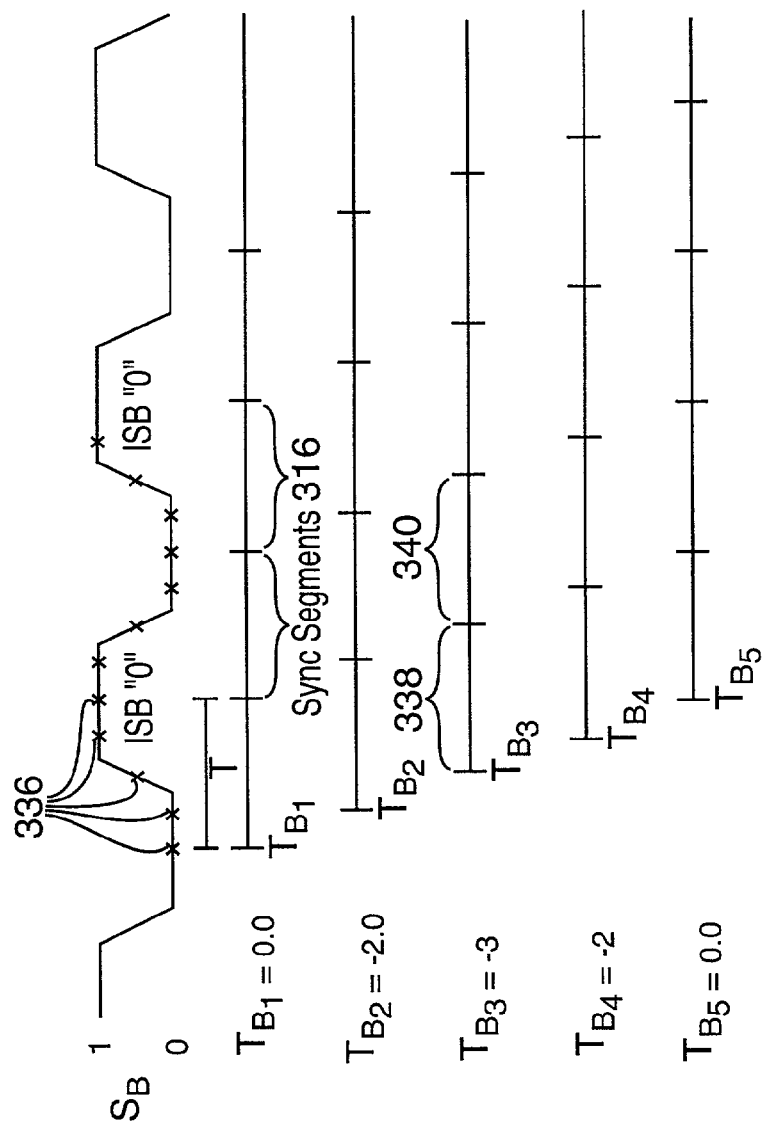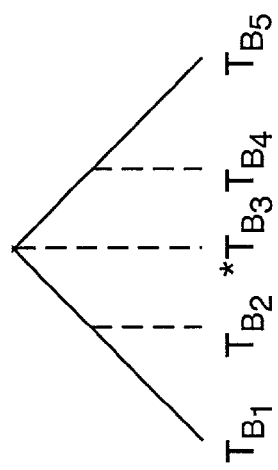
FIG. 21
FIG. 22

NETWORK DELAY IDENTIFICATION METHOD AND APPARATUS

RELATED APPLICATIONS

This application is a continuation-in-part of U.S. patent application Ser. No. 09/531,367 filed Mar. 21, 2000 now U.S. Pat. No. 6,690,681 which is a continuation-in-part of U.S. application Ser. No. 09/230,079, filed May 13, 1999 (now U.S. Pat. No. 6,144,336), which is a U.S. national phase application corresponding to International Application No. PCT/US98/10317, filed May 19, 1998 claiming the benefit of U.S. Provisional Patent Application Nos. 60/047,034, 60/047,140, 60/048,369, 60/048,385, 60/055,497, filed on May 19, 1997, May 20, 1997, Jun. 3, 1997, Jun. 3, 1997, and Aug. 12, 1997, respectively; and is a continuation-in-part of U.S. application Ser. No. 09/484,942, filed Jan. 18, 2000 now U.S. Pat. No. 6,771,629, which claims priority from U.S. Provisional Application No. 60/116,093, filed Jan. 15, 1999, all of which are incorporated herein by reference in their entirety.

BACKGROUND OF THE INVENTION

Portable devices often need to be synchronized with a reference system. For example, portable Global Positioning Systems (GPS), derive position data from signals transmitted from satellites. The portable GPS device uses a clock to obtain a position fix with a GPS satellite. When the GPS signals are not available, for example, because the satellites are out of view, or when the mobile device has not acquired the satellite signal, the mobile device must be resynchronized with a reference clock due to drift in the mobile unit clock over time.

Network delay is defined as the time required to send synchronization information over a network between a reference station and a remote station. In order to accurately resynchronize a remote clock with a reference clock, it is necessary to account for this network delay.

This patent application describes a system for resynchronizing a clock in a portable device by sending a pulse from a reference station to the portable device. The portable device relays a pulse back to the reference station. The reference station measures the time difference between the transmitted pulse and the received pulse. This time difference is then used to resynchronize the clock in the portable device.

The present invention provides another technique for identifying network delay.

SUMMARY OF THE INVENTION

Network delay is determined in order to synchronize a clock in a mobile station with a reference clock. Tones are generated that represent a sequence of bits in a synchronization flag. The tones are sampled beginning at a selected sample start time. The sampled tones are demodulated to identify the bit values in the synchronization flag. The demodulator is synchronized with the sampled tones in the synchronization flag by shifting the sample start time until the samples generate an optimum synchronization value. A reference time is then identified according to the optimum sample start time.

The foregoing and other features and advantages of the invention will become more readily apparent from the following detailed description of preferred embodiments of the invention, which proceeds with reference to the accompanying drawings.

BRIEF DESCRIPTION OF THE DRAWINGS

FIG. 21 is a timing diagram showing how the synchronization circuit in FIG. 19 operates.

FIG. 22 is a graph showing how the synchronization circuit identifies the optimum synchronization start time.

DETAILED DESCRIPTION OF PREFERRED EMBODIMENTS

Figure 1:
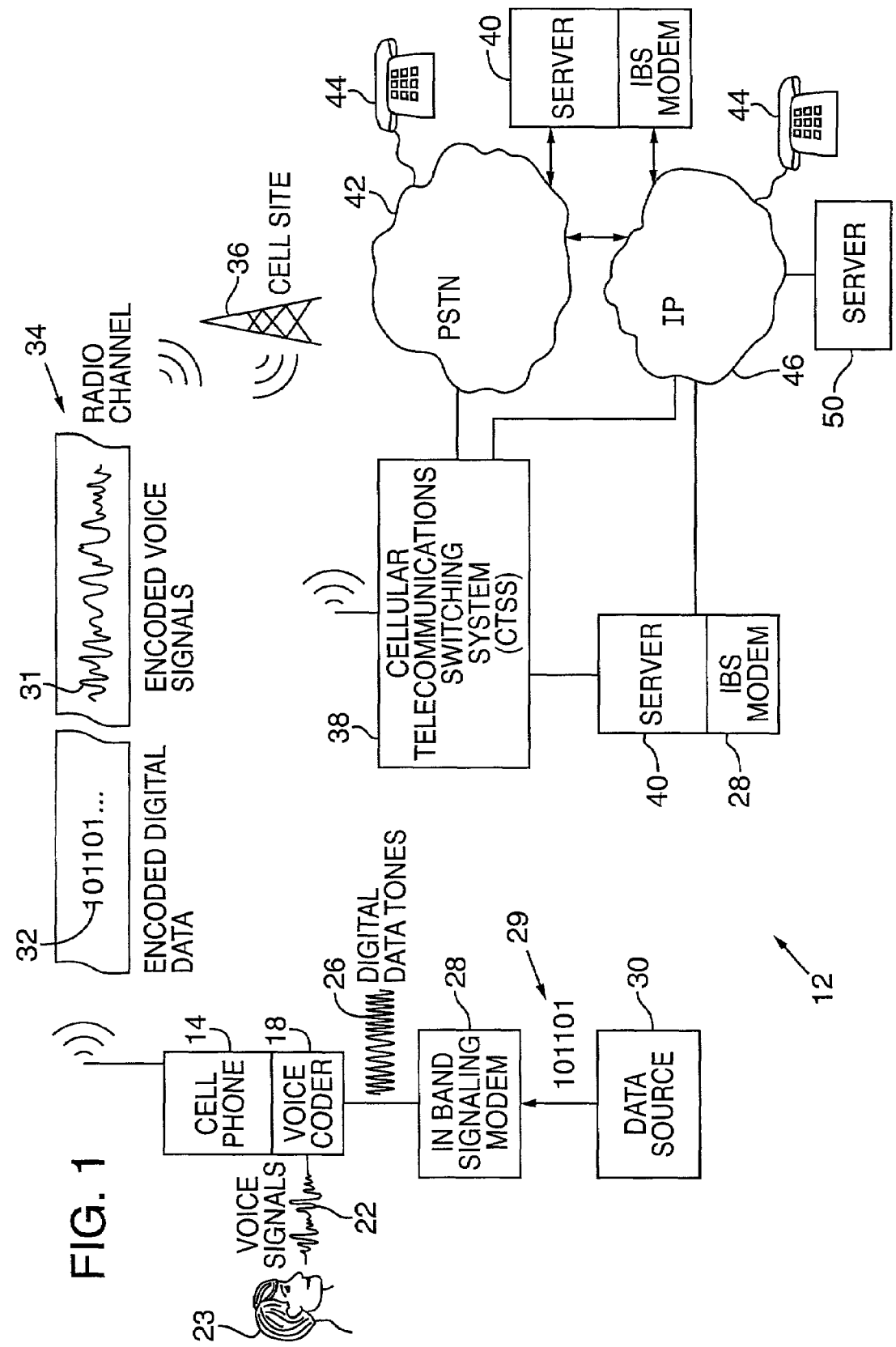
FIG. 1 is a diagram showing a wireless communications network that provides in-band signaling (IBS) according to the invention.

Referring to FIG. 1, a wireless communications network 12 includes a cell phone 14 that receives voice signals 22 from a user 23. A voice coder (vocoder) 18 in the cell phone 14 encodes the voice signals 22 into encoded digital voice signals 31 that are then transmitted over a wireless digital radio channel 34 (cell call). The cell phone 14 transmits the encoded voice signals 31 to a cellular communications site (cell site) 36 that relays the cell call to a Cellular Telecommunications Switching System (CTSS) 38.

The CTSS 38 either connects the cell call to another cell phone either in the wireless cellular network 12, to a landline phone on a PSTN network 42 as a circuit switched call or routes the cell call over a packet switched Internet Protocol (IP) network 46 as a Voice Over IP (VoIP) call. The cell call can also be routed from the PSTN network 42 back to the cellular network 12 or from the PSTN network 42 to the IP network 46, or visa versa. The cell call eventually reaches a telephone 44 that corresponds with a destination phone number originally entered at the cell phone 14.

Additional data could be inserted at any point in the cellular network 12, such as in PSTN network 42 and IP network 46 and the signal remodulated for transmission over wireline or cellular networks. Such data could be system related such as routing information, toll or tariff information, etc.

An In-Band Signaling (IBS) modem 28 enables cell phone 14 to transmit digital data 29 from a data source 30 over the radio channel 34 of the cellular network 12. The IBS modem 28 modulates the digital data 29 into synthesized digital data tones 26. The digital data tones 26 prevent the encoding components in the cellular network 12 and landline network 42, such as vocoder 18, from corrupting the digital data. The encoding and modulation scheme used in the IBS modem 28 allows digital data 29 to be transmitted through the same voice coder 18 used in the cell phone 14 for encoding voice signals 22. Any appliance such as a vending machine, etc could be enhanced by this technology.

Synthesized tones are defined as signals that represent digital data that also have signaling characteristics that enable the signals to be encoded and decoded by a voice codec without losing the digital data information in the signal. In one example, Frequency Shift Keying (FSK) signals are used to created the synthesized tones at different frequencies within the audio range of human speech.

The IBS modem 28 enables voice signals 22 and digital data 29 to be transmitted over the same digital audio channel using the same cell phone circuitry. This prevents a user from having to transmit digital data using a separate wireless modem and enables a cell phone user to talk and send data during the same digital wireless call.

The invention modulates the digital data 29 into synthesized audio tones. This prevents the cell phone vocoder 18 from filtering or corrupting the binary values associated with the digital data 29. The same cell phone transceiver and encoding circuitry is used for transmitting and receiving both voice signals and digital data. This enables the IBS modem 28 to be much smaller, less complex and more energy efficient than a standalone wireless modem. In some embodiments, the IBS modem 28 is implemented entirely in software using only the existing hardware components in the cell phone 14.

One or more servers 40 are located at any of various locations in the wireless network 12, PSTN network 42, or IP network 46. Each server 40 includes one or more IBS modems 28 that encode, detect and decode the digital data 29 transmitted and received over the digital radio channel 34. Decoded digital data is either processed at the server 40 or routed to another computer, such as computer 50.

Figure 2:
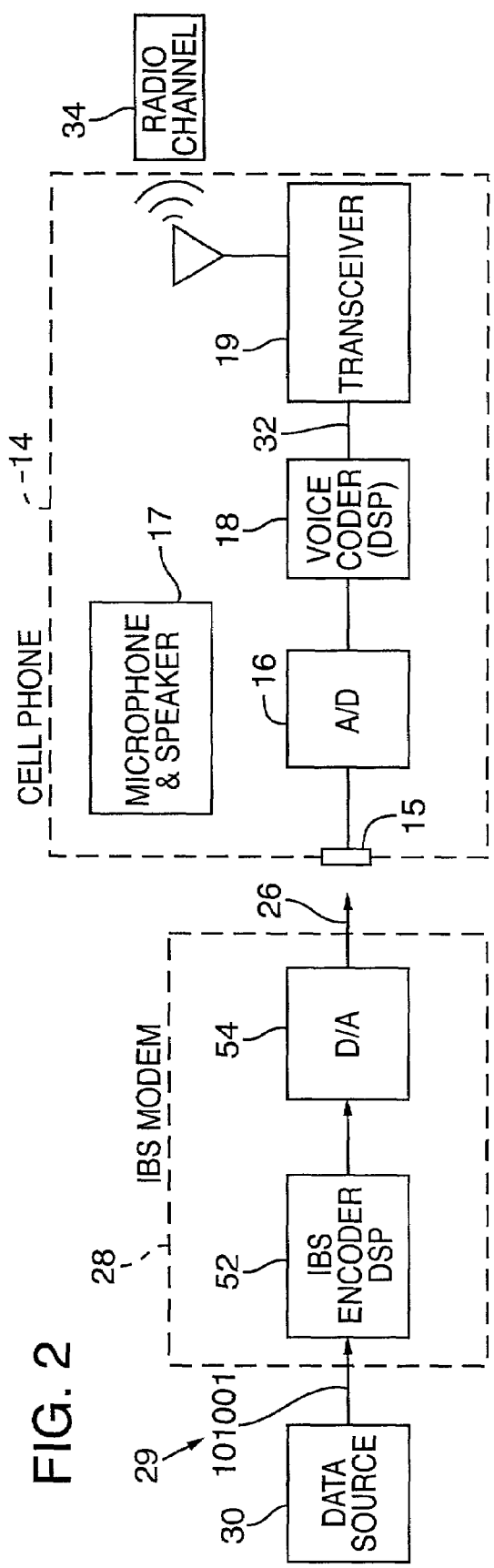
FIG. 2 a detailed diagram of a cellular telephone coupled to an IBS modem according to one embodiment of the invention.

Referring to FIG. 2, a first transmitting portion of the IBS modem 28 includes an IBS encoder 52 and a Digital to Analog converter (D/A) 54. The IBS encoder 52 is typically implemented using a Digital Signal Processor (DSP). The data source 30 represents any device that requires wireless transmission or reception of digital data. For example, the data source 30 can be a laptop computer, a palm computer or a Global Positioning System (GPS) (see FIG. 15).

The data source 30 outputs a digital bit stream 29 to the IBS encoder 52. The IBS encoder 52 converts the digital data 29 into IBS packets specially formatted for transmission over a digital wireless voice channel. The IBS encoder 52 then converts the bits from the IBS packets into digital data tones that are then fed into the D/A converter 54.

The IBS modem 28 outputs binary values that each represent an amplitude and phase component of an audio tone. The D/A converter 54 converts these digital values into analog audio tones 26 that are then output to an auxiliary audio port 15 on the cell phone 14. The analog audio tones 26 are then processed by the cell phone 14. An Analog to Digital (A/D) converter 16 in the cell phone 14 encodes the synthesized analog audio tones 26 into digital values. The vocoder 18 encodes the digital representations of the synthesized tones 26 into encoded digital data 32 and outputs the encoded data to a transceiver 19 that transmits the encoded digital data 32 over the radio channel 34.

The preferred voltage of the synthesized audio tones 26 output from the D/A converter 26 is around 25 millivolts peak to peak. This voltage level was discovered to prevent the audio tones 26 from saturating the voice channel circuitry in cell phone 14.

Because the digital data 29 is fed through the existing auxiliary hands free audio port 15 in cell phone 14, the IBS modem 28 can be installed as an after market device that can connect any data source 30 to the cell phone 14. The data source 30 can transmit digital data 29 in any digital format. For example, the digital data 29 can be sent over an RS-232 interface, Universal Serial Bus (USB) interface, or any other serial or parallel interface.

Figure 3:
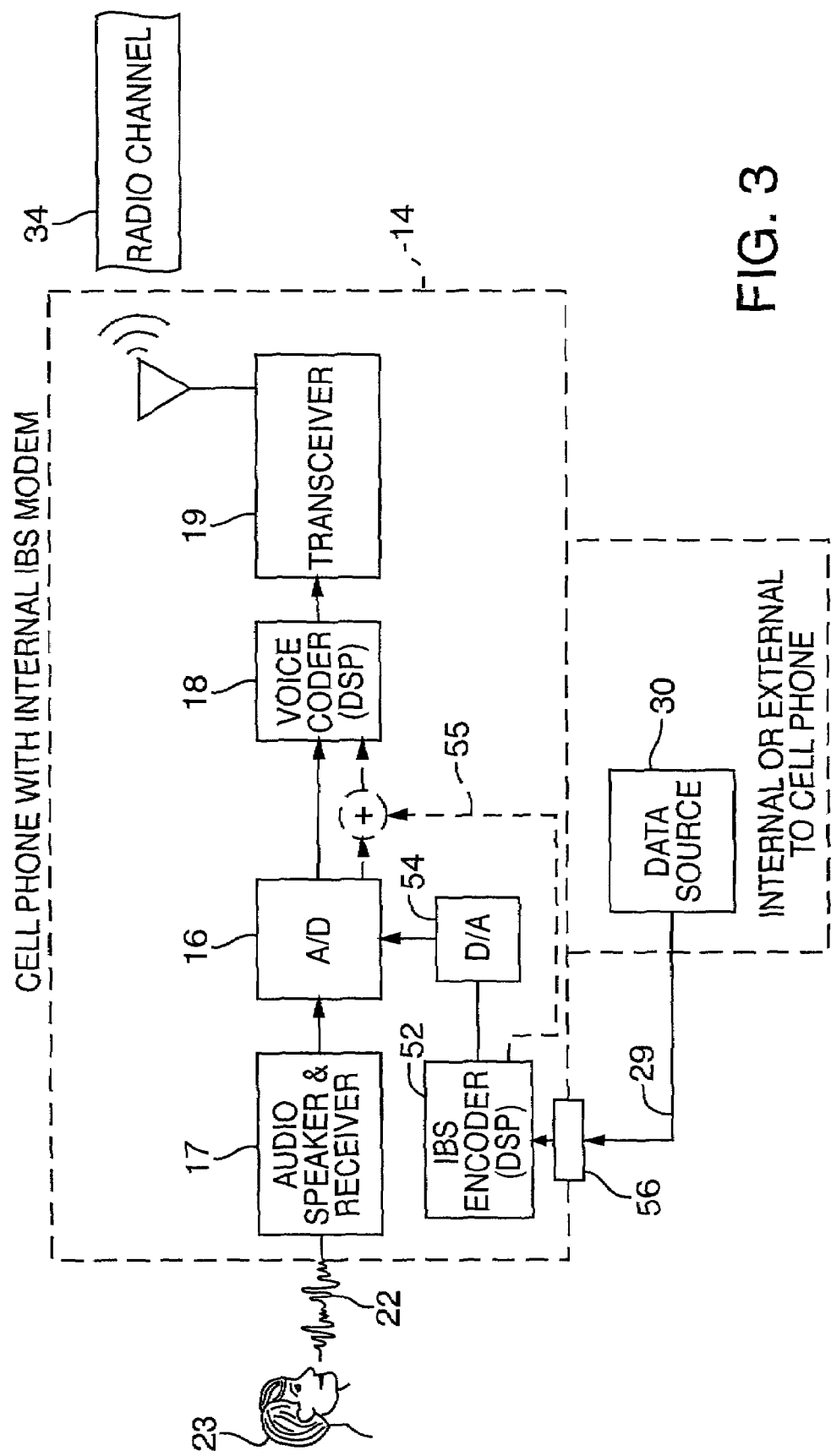
FIG. 3 is another embodiment of the IBS modem according to the invention.
Figure 14:
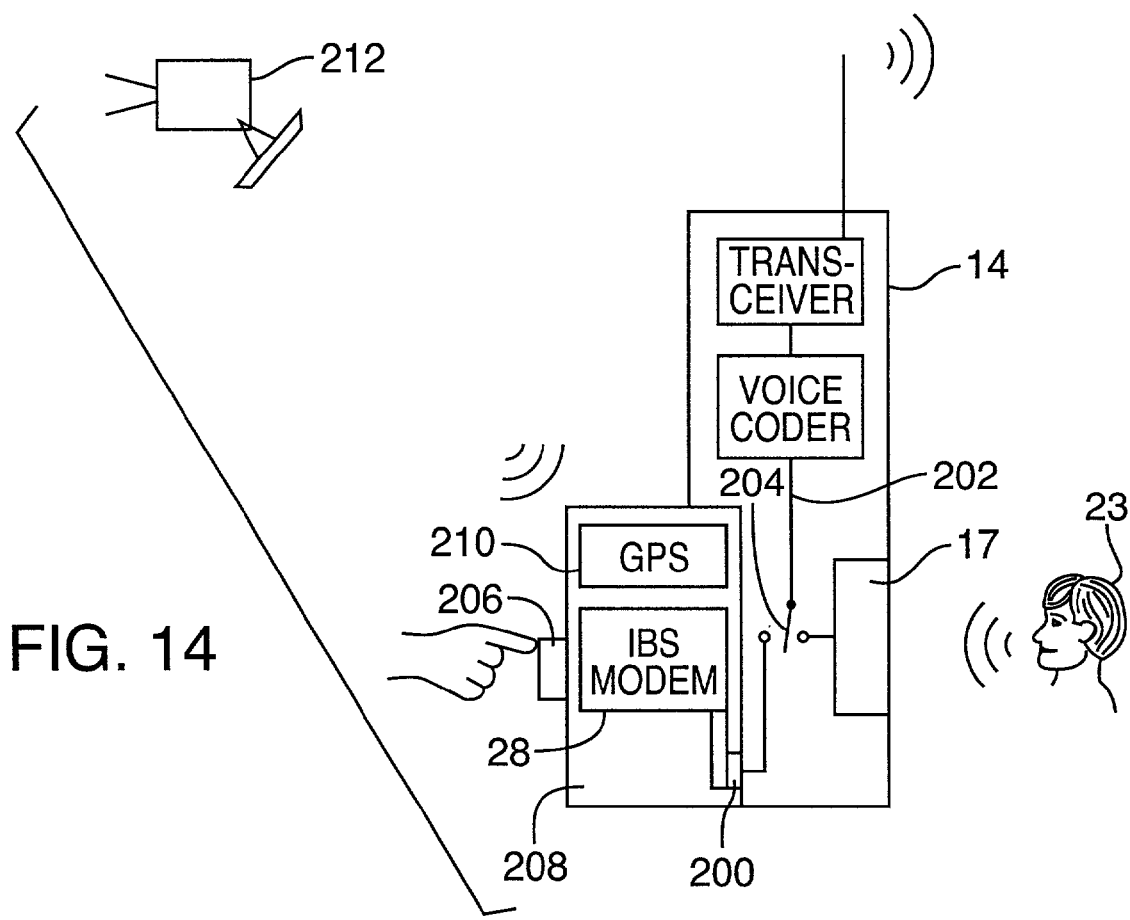
FIG. 14 is a schematic diagram of a cellular phone with the IBS modem located in a detachable battery pack.

FIG. 3 shows an alternative embodiment of the IBS modem 28. The IBS modem 28 in FIG. 3 is located inside the cell phone 14 and is implemented in software using the existing cell phone processor or using some combination of its own components and the existing cell phone components. In this embodiment, the cell phone 14 may include a data port 56 that receives the digital data 29 from the external data source 30. In an alternative embodiment, the digital data source 30 is internal to the cell phone 14. For example, the data source 30 may be a Global Positioning System (GPS) chip that includes a GPS receiver (not shown) for receiving global positioning data from GPS satellites (FIG. 14).

The IBS encoder 52 in FIG. 3 as mentioned above is typically implemented in software using a DSP and may use the same DSP used for implementing the vocoder 18. The D/A converter 54 outputs the synthesized audio tones representing digital data 29 to the internal A/D converter 16 of the cell phone 14. The IBS encoder 52 in an alternative embodiment, not only synthesizes the digital data 29 into audio tones but also quantizes the digital frequency values. The IBS encoder 52 then outputs the quantized data 55 directly into the vocoder 18. In still another embodiment of the invention, the IBS encoder 52 is implemented entirely in software in the same DSP that implements the vocoder 18.

The vocoder 18 uses a specific encoding scheme associated with the wireless communications network 12 (FIG. 1). For example, the vocoder 18 could be a VCELP encoder that converts voice signals into digital CDMA signals. The A/D converter 16, D/A converter 54 and transceiver 19 are existing cell phone components known to those skilled in the art.

It is important to note that the IBS encoder 52 enables the digital data 29 to be transmitted using the same cell phone circuitry that transmits voice signals. The IBS encoder 52 prevents any signal approximation, quantization, encoding, modulation, etc. performed by the, A/D converter 16, vocoder 18, or transceiver 19 from corrupting or filtering any bits from the digital data 29.

Figure 4:
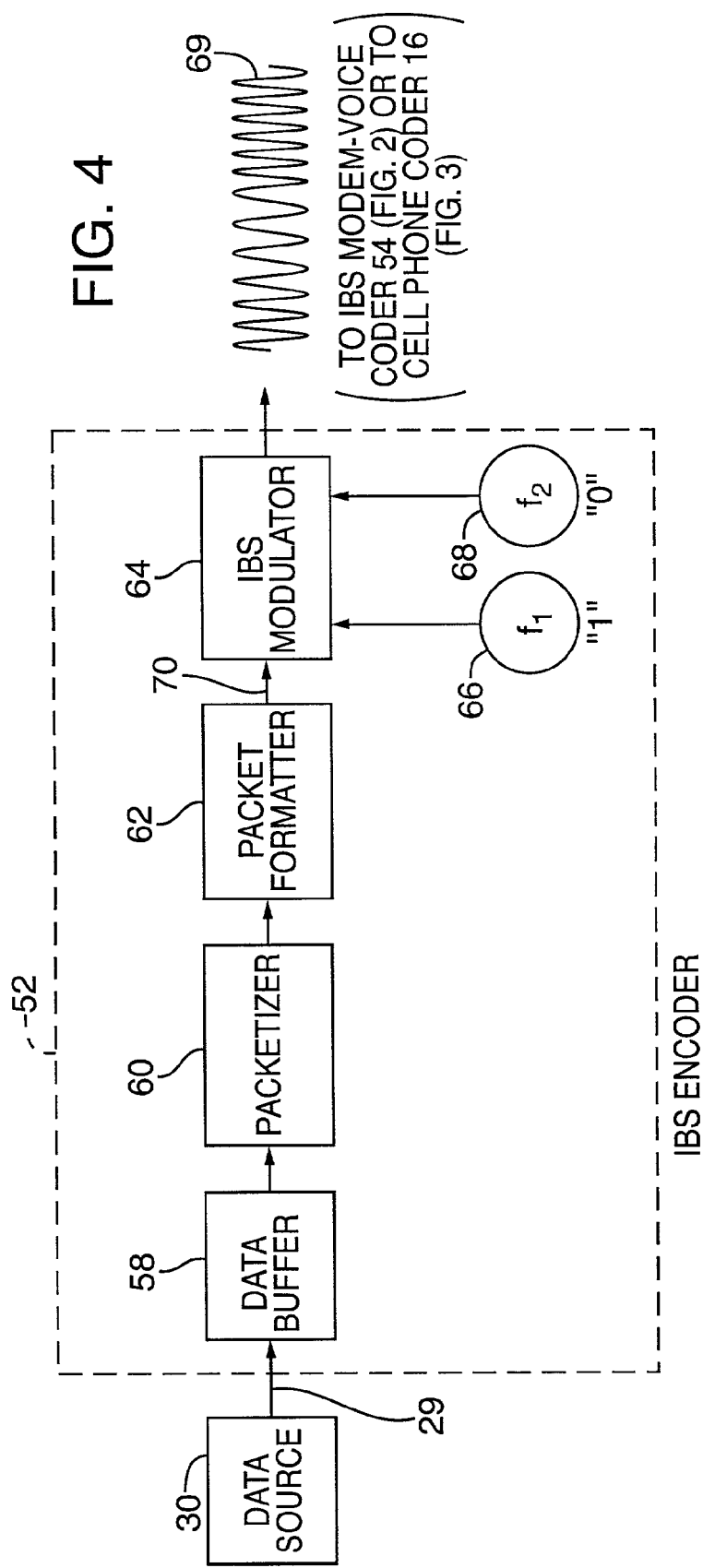
FIG. 4 is a detailed diagram of an IBS modem encoder.

FIG. 4 is a detailed diagram of the IBS encoder 52 shown in FIG. 2 and FIG. 3. A data buffer 58 stores the binary bit stream 29 from the data source 30. A packetizer 60 segments the bits in buffer 58 into bytes that comprise a IBS packet payload. A packet formatter 62 adds a packet preamble and postamble that helps prevent corruption of the IBS packet payload. An IBS modulator 64 then modulates the bits in the IBS packet with two or more different frequencies 66 and 68 to generate digital data tones 69.

Preventing Corruption of Digital Data in Voice Channels

Cell phone voice coders increase bandwidth in voice channels by using predictive coding techniques that attempt to describe voice signals without having to send all the information associated with human speech. If any unnatural frequencies or tones are generated in the voice channel (i.e., frequencies representing digital data), those frequencies might be thrown out by the voice coder 18 (FIG. 2). For example, if the amplitude of the digital data tones are greater than that of normal voice signals or the same digital data tone is generated for too long a time period, the voice coder 18 might filter out that high amplitude or extended frequency signal. Depending on how the digital data tones are encoded, the digital bits represented by those unnatural audio tones may be partially or entirely removed from the voice channel.

The IBS encoder 52 encodes the digital data 29 in a manner where voice coders will not filter or corrupt the tones representing digital data. The IBS encoder 52 does this by controlling the amplitudes, time periods and patterns of the synthesized audio tones used to represent the binary bit values.

Figure 5:
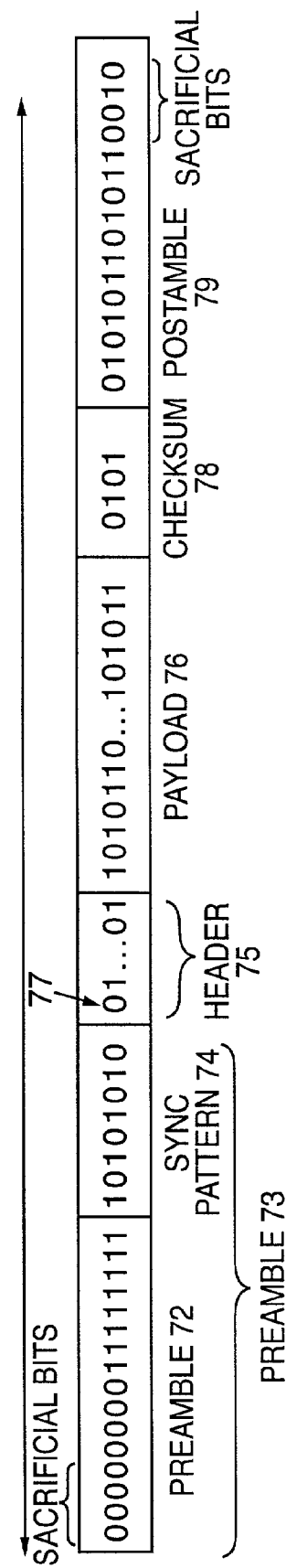
FIG. 5 is a schematic diagram of a IBS packet.

Referring to FIG. 5, the packet formatter 62 (FIG. 4) adds a packet preamble 73 and a header 75 to the front of a IBS packet 70. The packet preamble 73 includes a preamble pattern 72 and a sync pattern 74. A checksum 78 and a packet postamble 79 are attached to the backend of the IBS packet 70.

Figure 6:
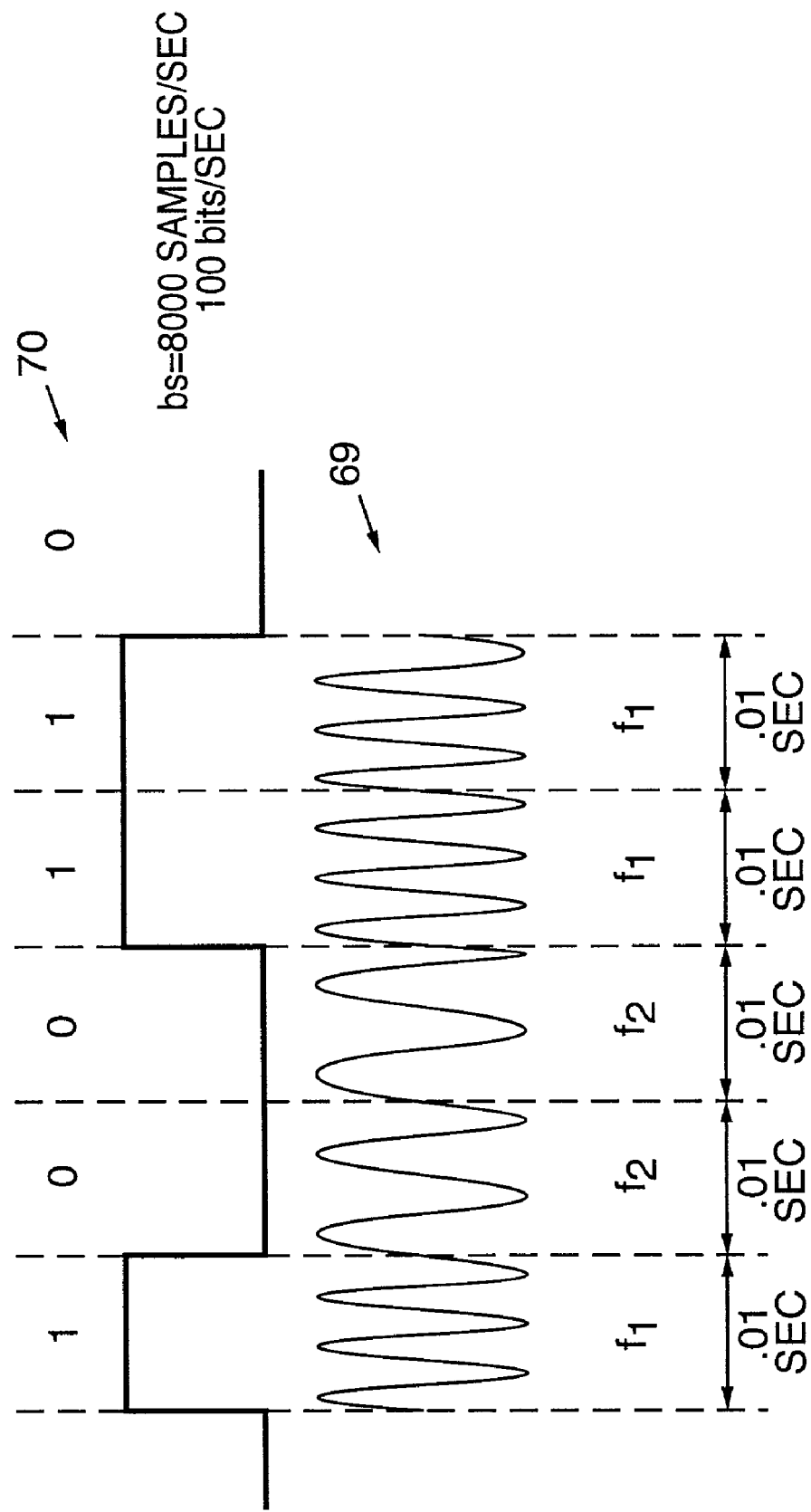
FIG. 6 is a schematic diagram of digital data tones output from a IBS modulator.

FIG. 6 shows the synthesized digital data tones 69 output from the IBS modulator 64 (FIG. 4). The IBS modulator 64 (FIG. 4) converts the digital bits in the IBS packet 70 into one of two different tones. A first tone is generated at an f1 frequency and represents a binary "1" value and a second tone is generated at a f2 frequency and represents a binary "0" value. In one embodiment the f1 frequency is 600 Hertz and the f2 frequency is 500 Hertz (Hz).

It has been determined that the most effective frequency range for generating the tones that represent the binary bit values are somewhere between approximately 400 Hertz and approximately 1600 Hertz, and preferably between 500 and 900 Hertz. The IBS modulator 64 includes Sine and Cosine tables that are used to generate the digital values that represent the different amplitude and phase values for the f1 and f2 frequencies.

In one embodiment of the invention, the digital data is output on the radio channel 34 at a baud rate of 400 bits/second. This baud rate has been found to be effective in preventing corruption of the digital audio data by a wide variety of different cellular telephone voice coders. The sine waves for each f1 and f2 tone begin and end at a zero amplitude point and continue for a duration of 10 milliseconds. Eighty samples are generated for each digital data tone.

Figure 7:
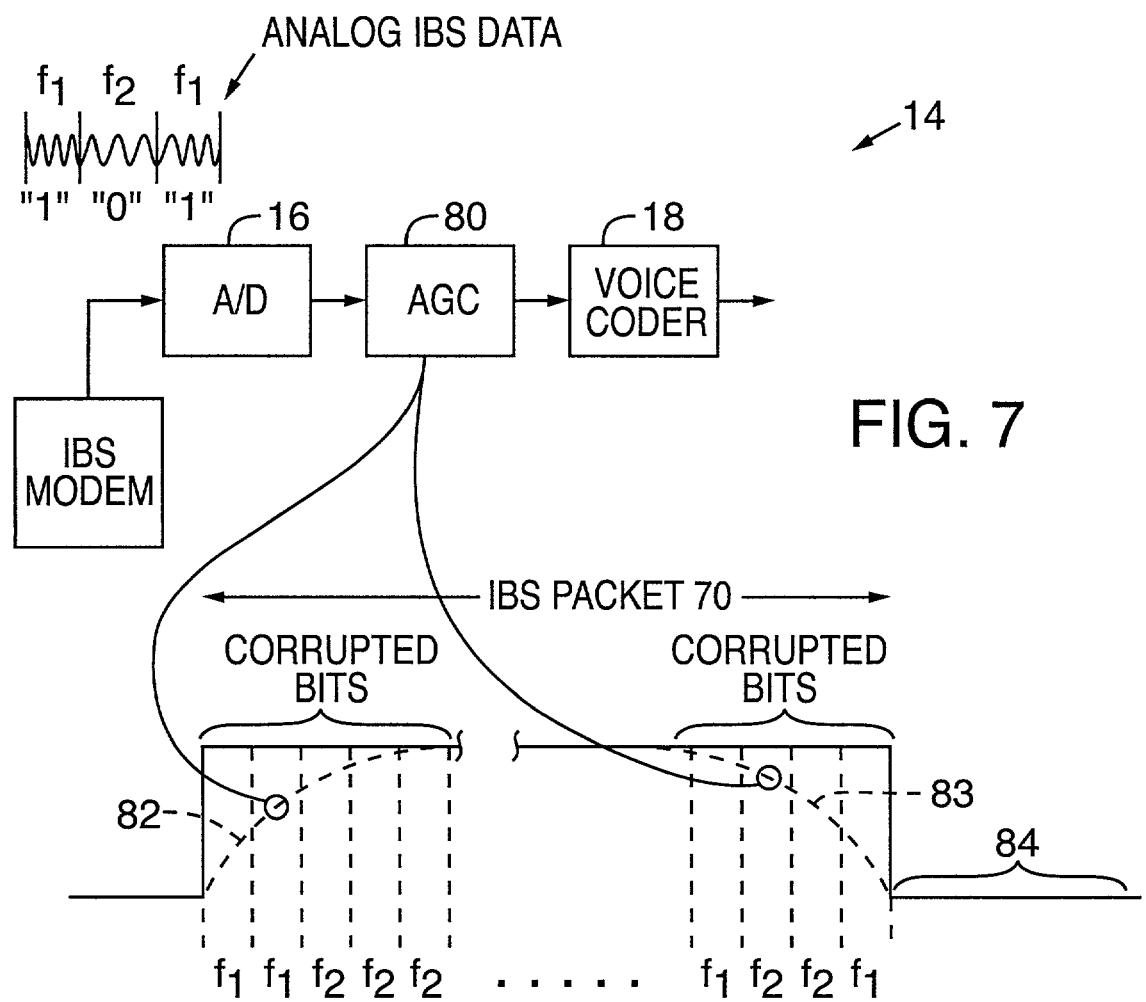
FIG. 7 is a diagram showing how digital data is corrupted by an Automatic Gain Controller.

Referring to FIG. 7, an Automatic Gain Controller (AGC) 80 is one encoding function used in the cell phone 14. The AGC 80 may be software that is located in the same DSP that implements the voice coder 18. The AGC 80 scales instantaneous energy changes in voice signals. There are situations when no voice signals have been fed into the AGC 80 for a period of time followed by a series of audio tones 82 that comprise the beginning of a IBS packet 70. The AGC 80 scales the first group of tones 82 at the beginning of the IBS packet 70. The AGC 80 also looks ahead at the zero signal levels 84 after the end of the IBS packet 70, and will scale the tones 83 at the end of the IBS packet 70 as part of its prediction scaling scheme. This scaling prevents the over amplification of signal or noise when instantaneous energy changes occur in the voice channel.

As previously shown in FIG. 6, the "1" and "0" bits of the IBS packet 70 are represented by tones f1 and f2, respectively. If these tones are scaled by the AGC 80, the digital bits represented by those frequencies might be dropped during encoding. For example, the vocoder 18 may see the scaled tones as noise and filter them from the audio channel. To prevent the unintentional filtering of tones that represent digital data, the IBS packet 70 in FIG. 5 includes preamble bits 72 and postamble bits 79. The preamble bits 72 and postamble bits 79 do not contain any of the digital data bits 29 from the data source but include a certain number of sacrificial bit(s) that are not needed for detecting or encoding the IBS packet 70. The tones that are generated for these sacrificial bits in the preamble and postamble can be scaled or filtered by the AGC 80 without effecting any of the digital data contained in the IBS packet payload 76.

The bit pattern in the preamble 72 and sync pattern 74 are specifically formatted to further prevent corruption of the packet payload 76. A random sequence and/or an alternating "1"–"0" sequence of bits is used in either the preamble 72 and/or sync pattern 74. These alternating or random bit patterns prevent adaptive filters in the cell phone vocoder 18 (FIG. 2) from filtering tones representing the remaining bits in the IBS packet 70.

Figure 8:
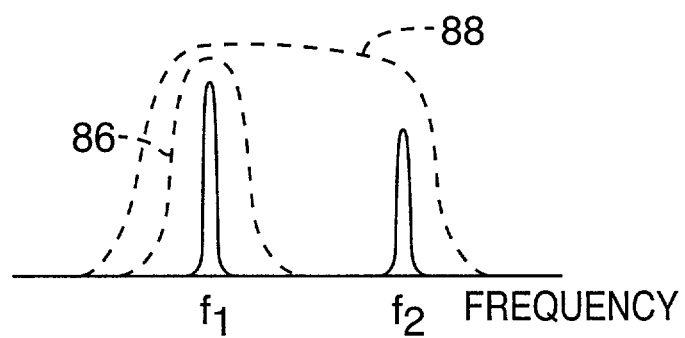
FIG. 8 is a diagram showing how a digital wireless network can filter out digital data tones.

Referring to FIG. 8, adaptive filters adapt around the frequencies that are currently being transmitted over the wireless network. For example, if a long period of the same f1 tone is currently being transmitted, an adaptive filter used in the cell phone may adapt around that f1 frequency spectrum as shown by filter 86.

Another short tone at another frequency f2 may immediately follow the long period of f1 tones. If the filter 86 is too slow to adapt, the first few f2 tones may be filtered from the voice channel. If the filtered f2 tone represent bits in the IBS bit stream, those bits are lost.

To prevent adaptive filters in the cell phone from dropping bits, some portion of the preamble 73 includes a random or alternating "1"–"0" bit pattern. This preconditions the adaptive filter as shown by filter 88. The preamble 73 (FIG. 5) tries to include a portion of the same bit sequence that is likely or does occur in the packet payload 76. For example, the IBS encoder 52 can look ahead at the bit pattern in the payload 76. The encoder 52 can then place a subset of bits in a portion of the preamble to represent the sequence of bits in the packet payload.

This preconditions the adaptive filter for the same f1 and f2 frequencies, in the same duration and in a similar sequence that is likely to follow in the IBS packet payload 76. Thus, the adaptive filter is less likely to filter out the tones that actually represent the digital data that is being transmitted.

Figure 9:
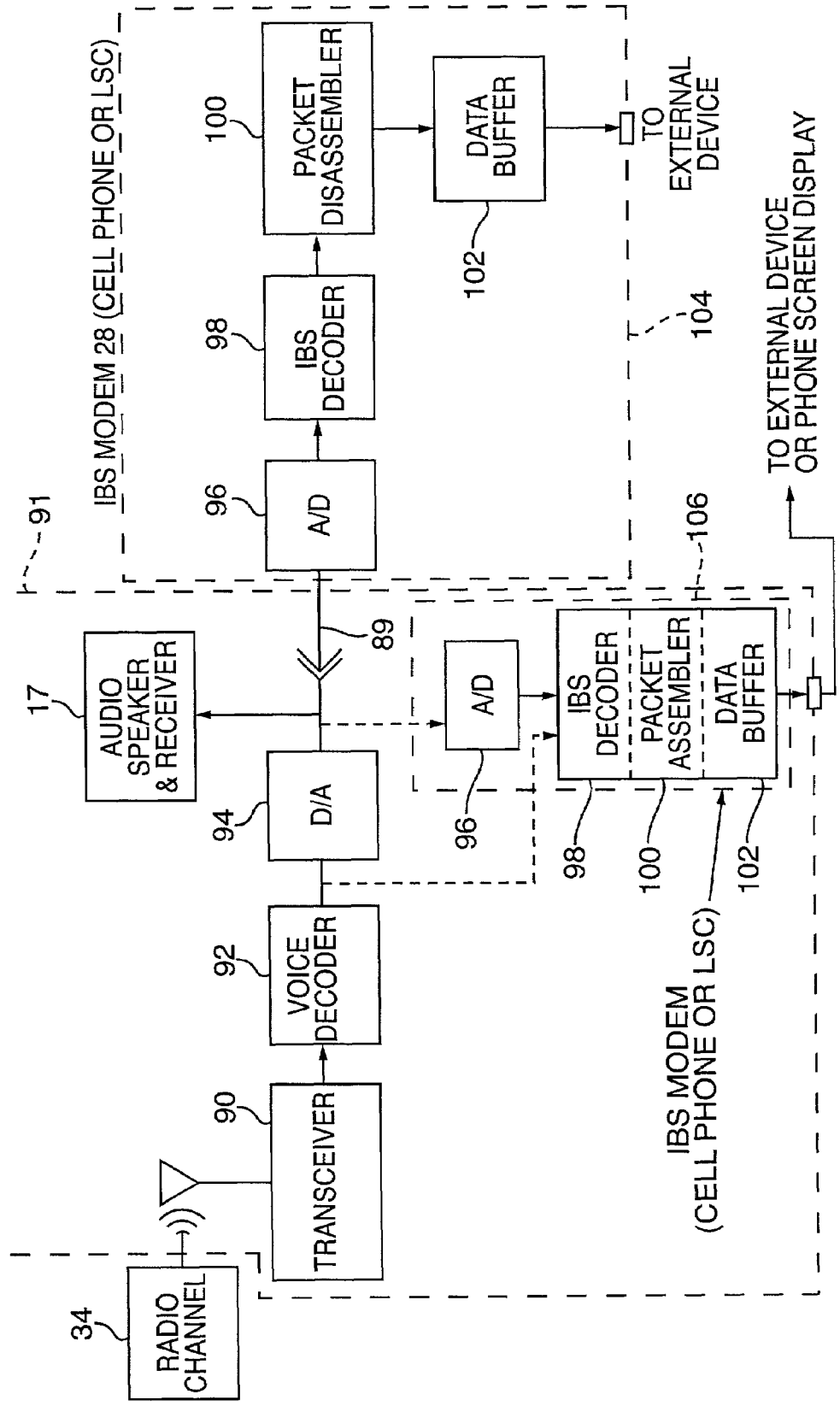
FIG. 9 is a detailed diagram of receiving circuitry coupled to an IBS modem decoder.

FIG. 9 is a block diagram of receive circuitry 91 that receives the voice and data signals in the radio channel 34. The IBS modem 28 also includes an IBS decoder 98 the detects and decodes the digital data tones transmitted in the radio channel 34. The receive circuitry 91 is located at the CTSS 38 (FIG. 1) that receives wireless transmissions from the cell sites 36 (FIG. 1). The same receive circuitry 91 is also located in the cell phone 14.

As described above in FIGS. 2 and 3, the decoder part of the IBS modem 28 can be external to the cell phone 14 or can be inside the cell phone 14. Dashed line 104 shows an IBS modem 28 external to a cell phone and dashed line 106 shows an internal IBS modem 28 internal to a cell phone. IBS modems 14 can be located at any telephone location in the PSTN network 42 or IP network 46 (FIG. 1). The receiving circuitry 91 may be different when the IBS modem 28 is coupled to a landline. However, the IBS modem 28 operates under the same principle by transmitting and receiving synthesized tones over the voice channel of the phone line.

The signals in radio channel 34 are received by a transceiver 90. A vocoder 92 decodes the received signals. For example, the vocoder 92 may decode signals transmitted in TDMA, CDMA, AMPS, etc. A D/A converter 94 then converts the digital voice signals into analog signals. The analog voice signals are then output from an audio speaker 17.

If the IBS modem 28 is external to the receiving circuitry 91, then a A/D converter 96 converts the analog signals back into digital signals. The IBS decoder 98 demodulates any tones representing digital data back into a digital IBS packets. A packet disassembler 100 disassembles the packet payload from the IBS packets 70 and stores the decoded digital data in a data buffer 102.

Figure 10:
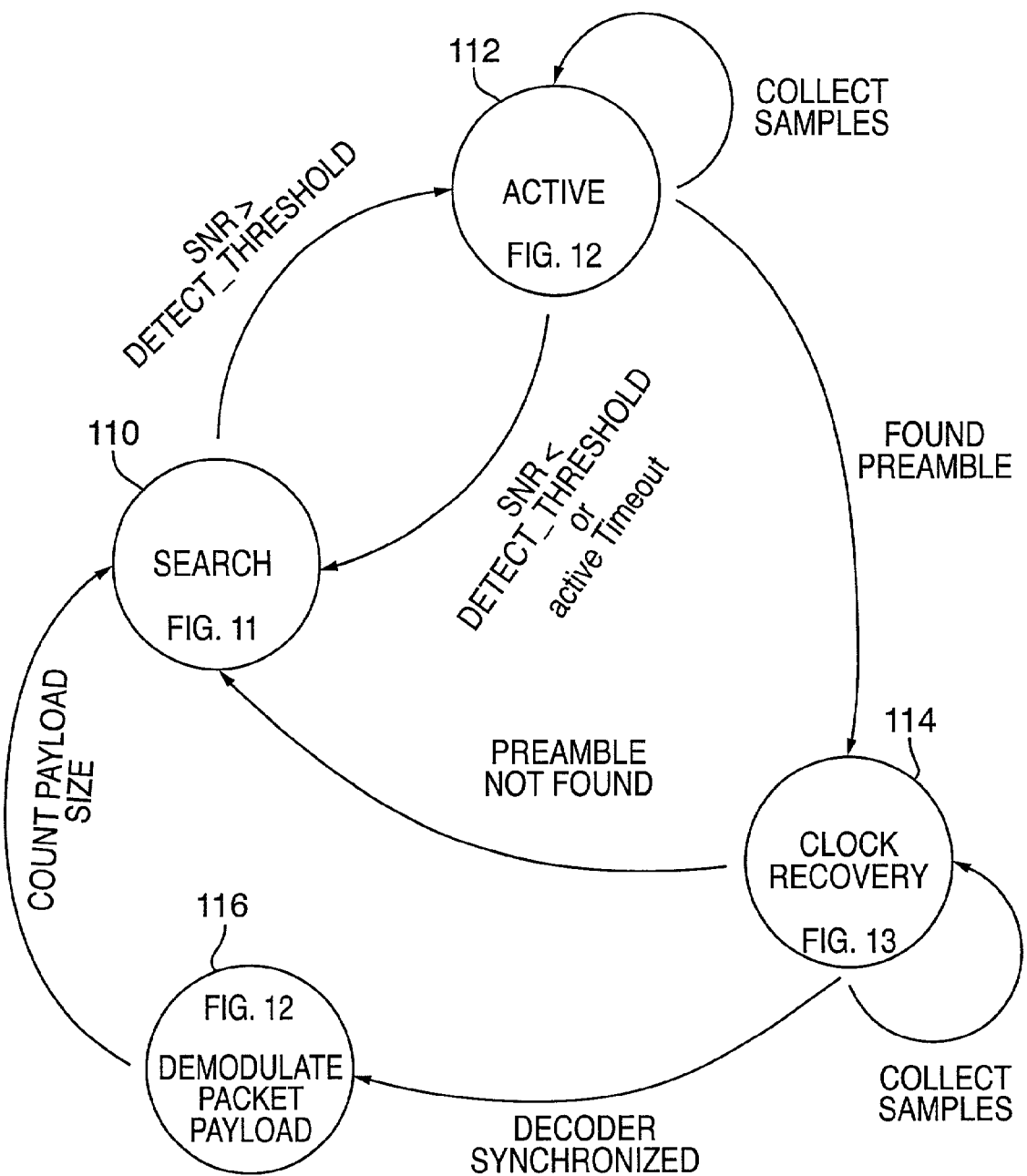
FIG. 10 is a state diagram for the IBS decoder shown in FIG. 9.

FIG. 10 is a state diagram explaining how the IBS decoder 98 in FIG. 9 operates. The IBS decoder 98 repeatedly samples and decodes the audio signals received from the radio channel 34. State 110 searches for tones in the audio signal that represent digital data. If the Signal to Noise Ratio (SNR), for tones within the frequency range of the digital data tones, are greater than a preselected value, the IBS decoder 98 goes into an active state 112. The active state 112 collects tone samples. If at any time during the active state 112 the SNR falls below an active threshold value or a timeout is reached before enough tone samples are collected, the IBS decoder 98 returns to the search state 110 and begins again to search for digital data tones.

After a number of samples are collected, the IBS decoder 98 looks for bits that identify the preamble 73 in the IBS packet 70 (FIG. 5). If the preamble 73 is detected, the IBS decoder 98 moves to clock recovery state 114. The clock recovery state 114 synchronizes with the synchronization pattern 74 in the IBS packet 70 (FIG. 5). The IBS decoder 98 then demodulates the packet payload 76 in state 116. If the preamble 73 is not found, IBS decoder 98 goes back to the search state 110 and starts searching again for the beginning of an IBS packet 70.

The IBS decoder 98 demodulates all of the packet payload 76 and then performs a checksum 78 as a final verification that a valid IBS packet 70 has been successfully demodulated. Control then returns back to the search state 110 and begins searching for the next IBS packet 70.

Figure 11:
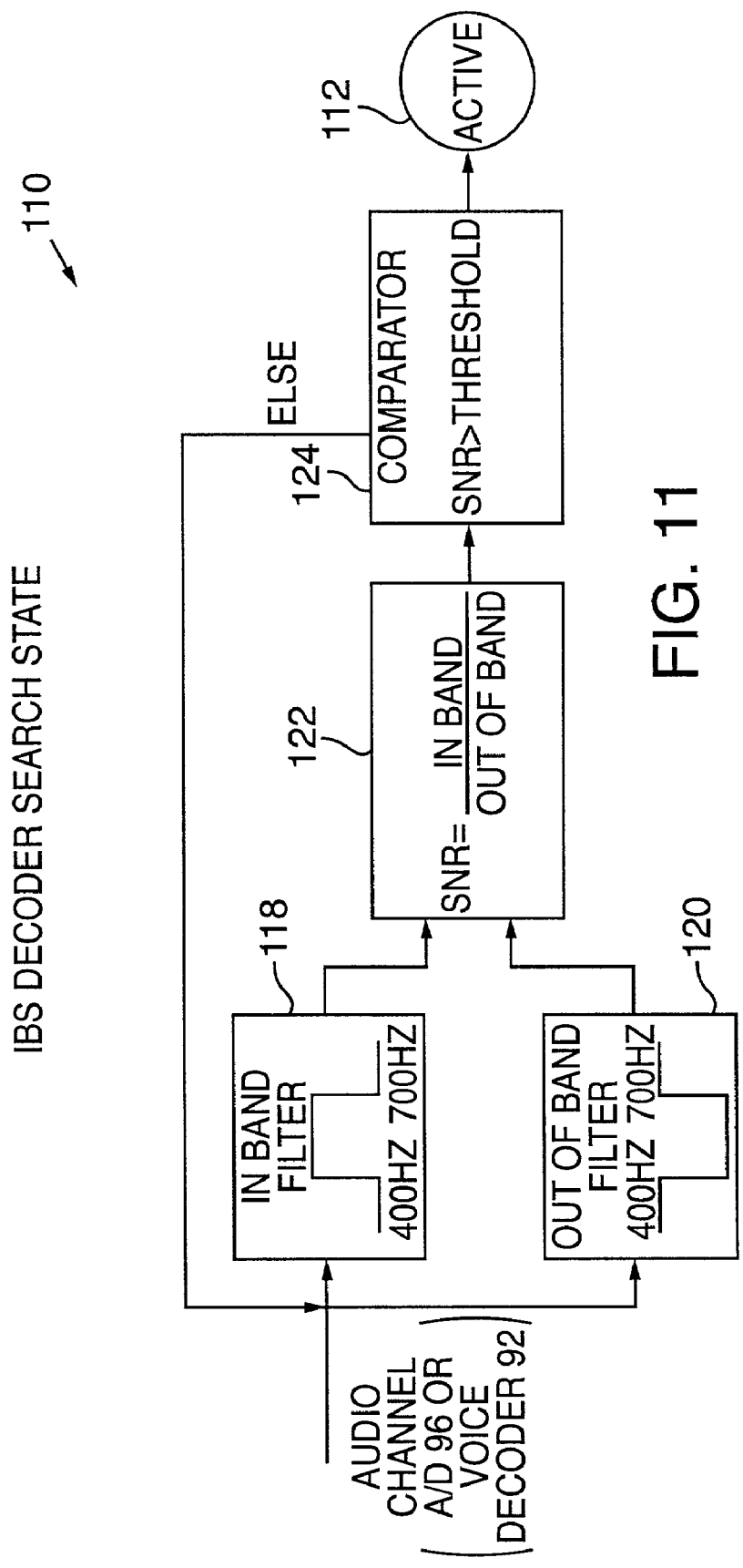
FIG. 11 is a block diagram showing a search state in the IBS decoder.

FIG. 11 is a detailed diagram for the search state 110 of the IBS decoder 98. The search state 110 uses in band and out of band filtering. "In band" is used in the following discussion to refer to tones within the frequency range of the two tones that represent the digital data binary "1" value (500 Hz) and the digital data binary "0" value (600 Hz).

A first band pass filter 118 (in band) measures energy for signals in the audio channel within the frequency range of about 400 Hz to around 700 Hz. A second band pass filter 120 (out of band) measures the energy in the audio channel for signals outside of the 400 Hz–700 Hz range. A Signal to Noise Ratio (SNR) is calculated in block 122 between the in band energy and the out of band energy. If tones representing the digital data exist in the audio channel, the energy measured by the in band filter 118 will be much greater then the energy measured by the out of band filter 120.

If the SNR is below a selected threshold in comparator box 124, signals in the audio channel are determined to be actual voice signals or noise. If the SNR is above the threshold, the IBS decoder 98 determines the tones represent in band digital data. When digital data is detected, the IBS decoder 98 moves into the active state 112 (FIG. 10) to begin searching for the beginning of an IBS packet 70.

Figure 12:
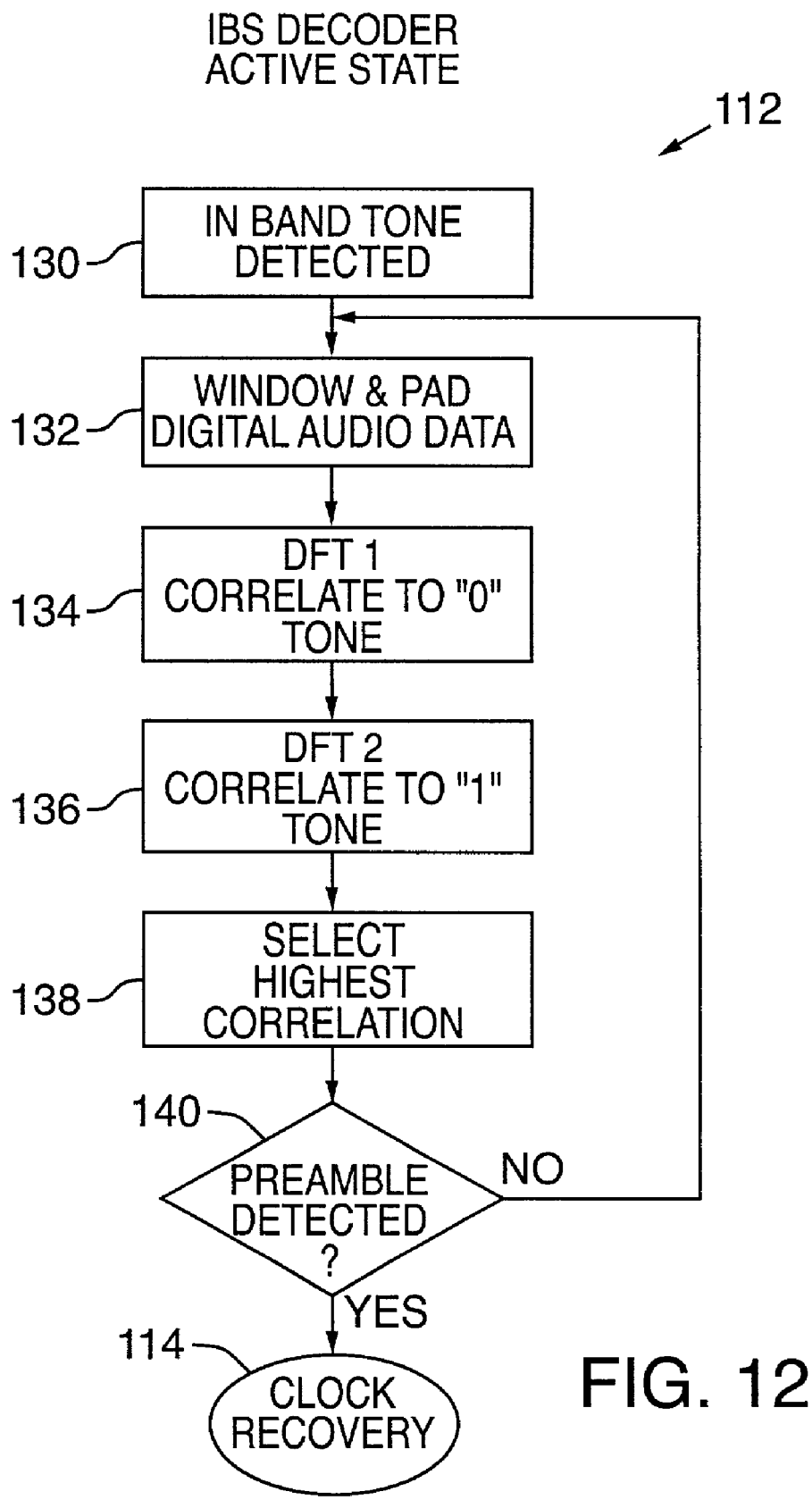
FIG. 12 is a block diagram showing an active state in the IBS decoder.

FIG. 12 shows the active state 112 for the IBS decoder 98. Block 130 is notified by the search state 110 when an in band tone is detected in the audio channel. Samples of the audio tones are windowed in block 132 with a number of samples associated with a single binary bit. In one embodiment, 80 samples of the digital data tone are taken, padded with zeros, and then correlated with Discrete Fourier Transforms (DFTs).

A first DFT has coefficients representing a 500 Hz tone and is applied to the windowed data in block 134. The first DFT generates a high correlation value if the samples contain a 500 Hz tone ("0" binary bit value). A second DFT represents a 600 Hz tone and is applied to the windowed samples in block 136. The second DFT generates a high correlation value if the windowed samples contain a 600 Hz tone ("1" binary bit value). Block 138 selects either a binary "0" or binary "1" bit value for the windowed data depending on which of the 500 Hz DFT or 600 Hz DFT yields the largest correlation value.

The IBS decoder 98 in decision block 140 continues to demodulate the tones until the preamble of the IBS packet 70 has been detected. The IBS decoder 98 then moves to clock recovery state 114 (FIG. 13) to synchronize with the sync pattern 74 in the IBS packet 70 (FIG. 5). If more bits need to be demodulated before the preamble 73 can be verified, decision block 140 returns to block 132 and the next 80 samples of the digital data tones are windowed and demodulated.

Figure 13:
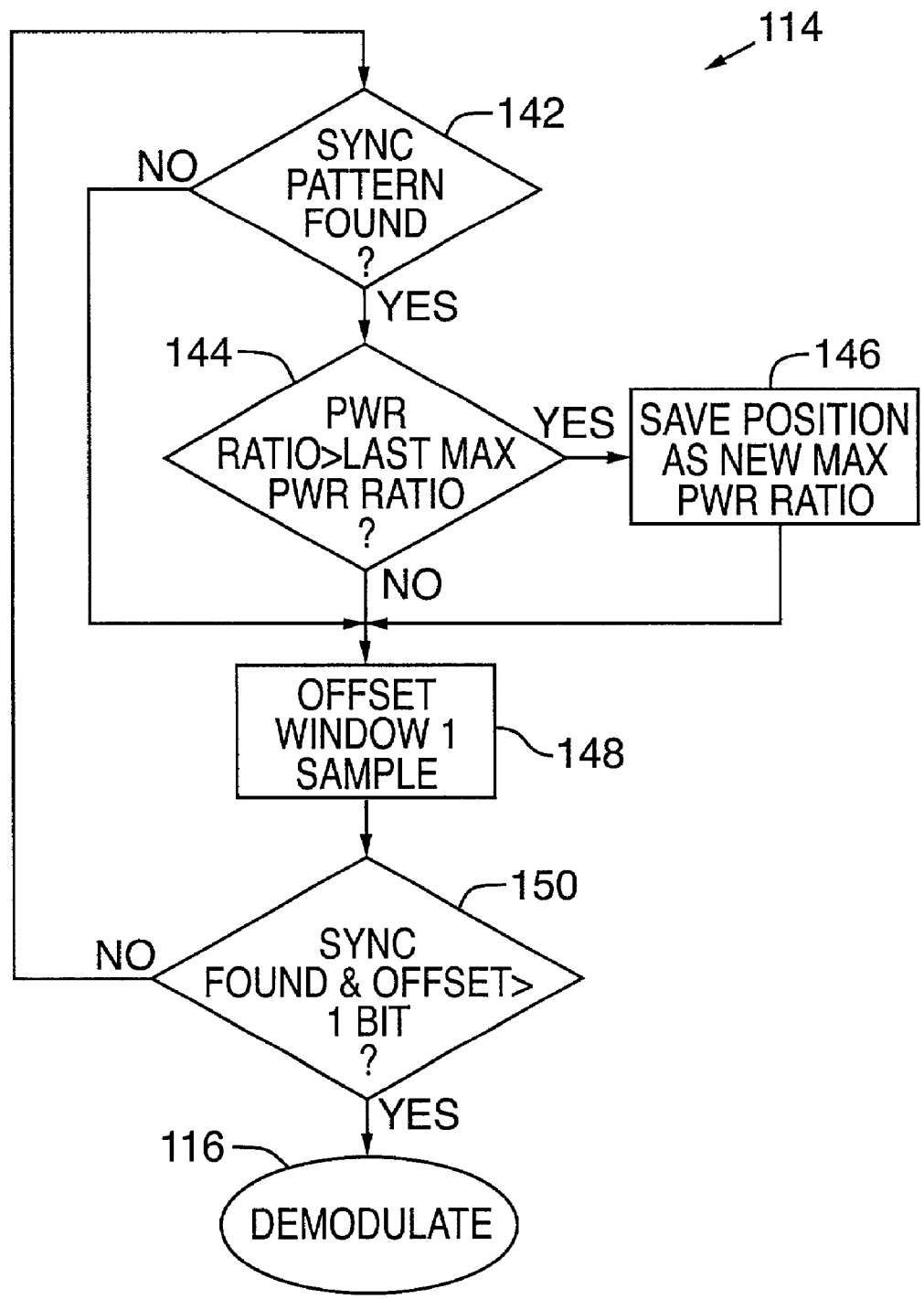
FIG. 13 is a block diagram showing a clock recovery state in the IBS decoder.

FIG. 13 describes the clock recovery state 114 for the IBS decoder 98. After the preamble 73 in the IBS packet 70 is detected in the active state 112, the clock recovery state 114 demodulates the next string of bits associated with the sync pattern 74 (FIG. 5). The clock recovery state 114 aligns the tone samples with the center of the correlation filters described in the active state 112. This improves decoder accuracy when demodulating the IBS packet payload 76.

Decision block 142 looks for the sync pattern 74 in the IBS packet 70. If after demodulating the next tone, the sync pattern 74 is not found, decision block 142 offsets the window used for sampling the sync pattern 74 by one sample in block 148. Decision block 150 then rechecks for the sync pattern 74. If the sync pattern 74 is found, decision block 144 determines the power ratio for the detected sync pattern. This power ratio represents a confidence factor of how well the demodulator is synchronized with the sync pattern. The power ratio is compared with the power ratios derived for different window shifted sampling positions. If the power ratio is greater then a previous sampling position, then that power ratio is saved as the new maximum power ratio in block 146.

If the power ratio for the sync pattern 74 is less then the previously measured power ratio, the decoder in block 148 offsets the sampling window by one sample position. The power ratio is then determined for the shifted window and then compared to the current maximum power ratio in decision block 144. The window is shifted until the maximum power ratio is found for the sync pattern 74. The window offset value at the maximum power ratio is used to align the demodulator correlation filters with the center sample of the first bit 77 (FIG. 5) in the IBS packet header 75.

The IBS decoder 89 then jumps to demodulate state 116 (FIG. 10) where the identified window offset is used to demodulate the remaining 500 and 600 Hz tones that represent the packet payload bits 76 and check sum bits 78. The demodulation state 116 correlates the f1 and f2 tones with DFTs in the same manner as in the active state (FIG. 12). The check sum bits 78 are then used as a final check to verify that a valid IBS packet has been received and accurately decoded.

FIG. 14 is a diagram of the IBS modem 28 located in a battery pack connected to the cellular telephone 14. A hands free audio channel pin 200 couples the IBS modem 28 to the voice channel 202 in the cell phone 14. A switch 204 couples either voice signals from the microphone 17 or digital data tones from the IBS modem 28 to the voice channel 202.

The switch 204 is controlled either through a menu on a screen (not shown) in the cell phone 14 or by a button 206 that extends out of the back end of the battery pack 208. The switch 204 can also be controlled by one of the keys on the keyboard of the cell phone 14.

The button 206 can also be used to initiate other functions provided through the IBS modem 28. For example, a Global Positioning System (GPS) includes a GPS receiver 210 located in the battery pack 208. The GPS receiver 210 receives GPS data from a GPS satellite 212. A cell phone operator simply pushes button 206 during an emergency situation. Pressing the button 206 automatically enables the GPS receiver 210 to collect GPS data from GPS satellite 212. At the same time, the switch 204 connects IBS modem 28 on the voice channel 202 of the cell phone 14. The IBS modem 28 is then activated. As soon as the GPS data is collected in the IBS modem 28, the data is formatted, encoded and output by IBS modem 28 to the voice channel 202 of the cell phone 14.

The user 23 can push the button 206 anytime after manually calling up a phone number. After the audio channel is established with another endpoint, the user 23 pushes button 206. Switch 204 is connected to the IBS modem 28 and the IBS modem 28 is activated. The GPS data (or other digital source) is then sent as digital data tones through the IBS modem 28 to an endpoint over the established audio channel. After the data has been successfully transmitted, the user presses button 206 again reconnecting switch 204 to the audio receiver 17.

Figure 15:
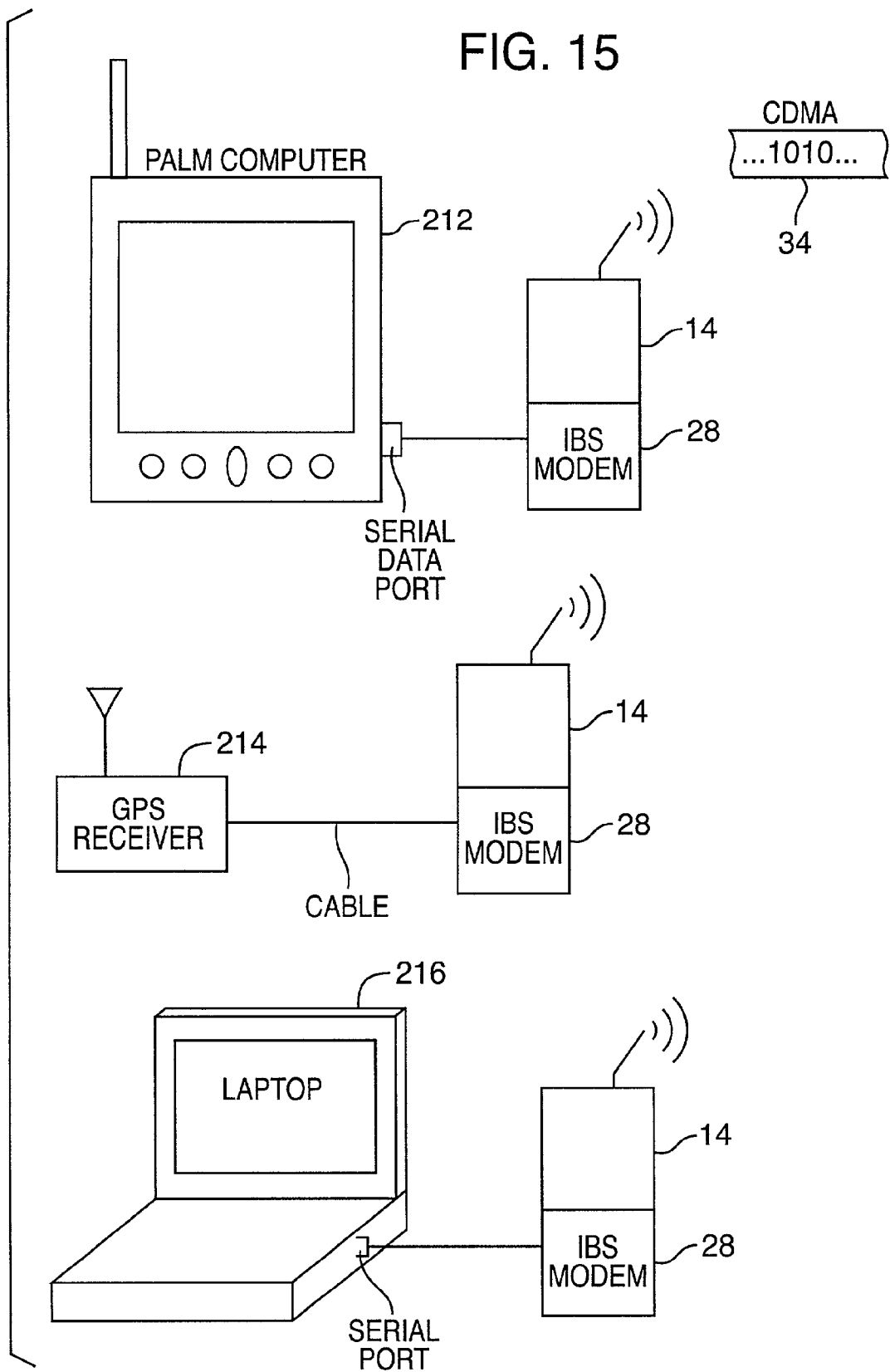
FIG. 15 are schematic diagram showing different data sources coupled to a cellular telephone through a IBS modem.

FIG. 15 shows the different types of data sources that can be connected to the IBS modem 28. Any one of a palm computer 212, GPS receiver 214 or a computer 216, etc. can are coupled to the IBS modem 28. The IBS modem 28 converts the bits output from the device into digital data tones that are then output over the radio channel 34 in the wireless network. Because data can transmitted to another endpoint through the cell phone 14, none of the devices 212, 214 or 216 need a separate wireless modem.

Implementation of Inband Signaling Modem in a Sound Card

Figure 16:
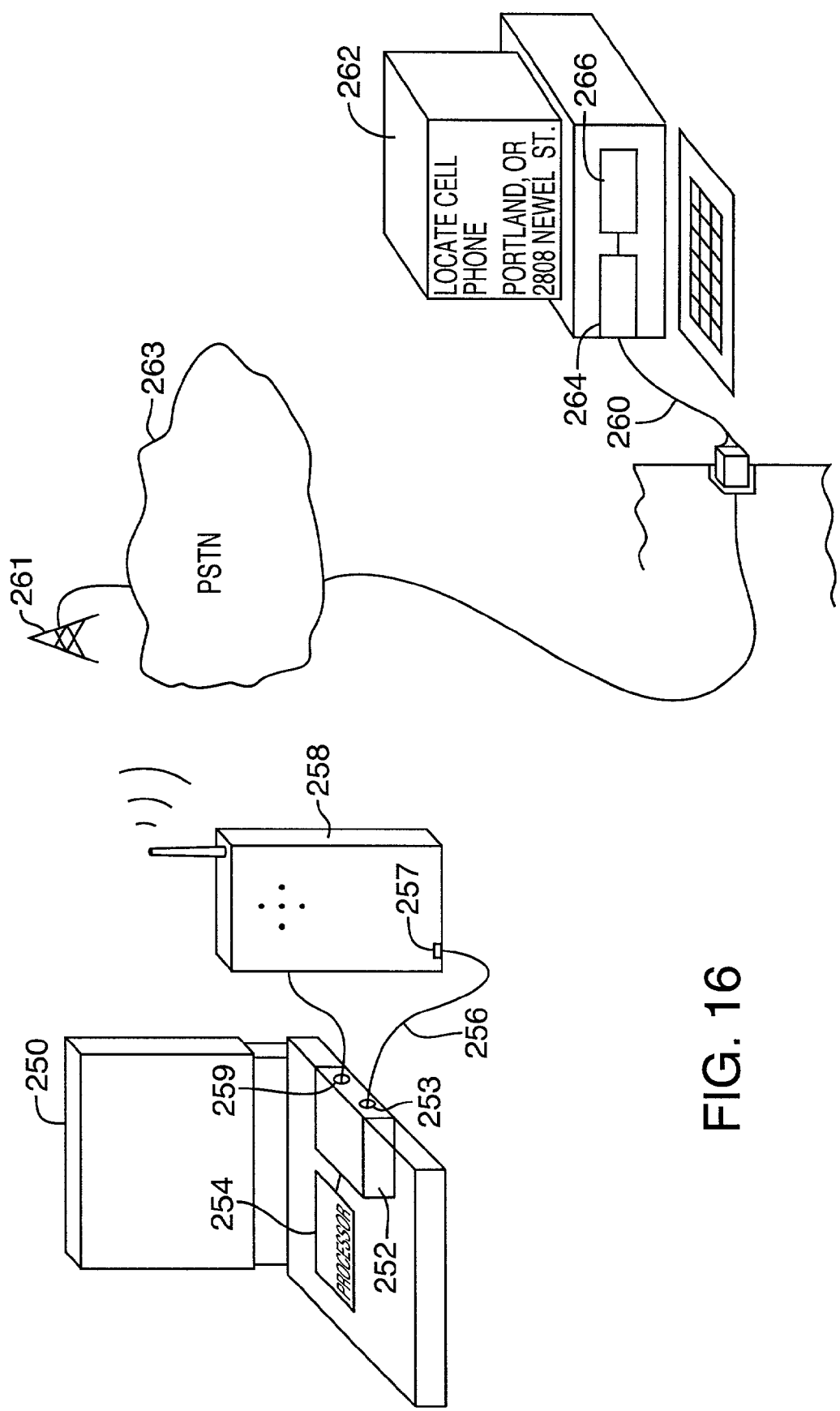
FIG. 16 is a schematic diagram showing implementation of the IBS modem using a sound card.

The IBS modem can be implemented in a standard computer sound card. Referring to FIG. 16, a sound card 252, such as a Sound Blaster card manufactured by Creative Labs, Inc., 1523 Cimarron Plaza; Stillwater, Okla. 74075 is included in a computer 250. A speaker output 253 of the sound card 252 outputs audio tones to a hands free port 257 on a cell phone 258. A microphone input 259 on the sound card 252 is connected to the speaker output of the cell phone 258.

The computer includes a processor 254 that converts digital data into an audio format used by the sound card 252 to output synthesized audio tones. The cell phone 258 encodes and transmits those audio tones over the voice channel of a wireless communications network. A cell site 261 receives the transmitted audio tones and forwards the audio tones over a PSTN network 263. A computer 262 is connected to a telephone line 260 at the destination location of the phone call. Another sound card 264 and a processor 266 in computer 262 demodulate the audio tones back into digital data. The digital data represented by the audio tones are displayed on computer 262. The sound cards may be used for data encoding, decoding or both. The sound cards may be used at computer 250, computer 262, or both.

Figure 17:
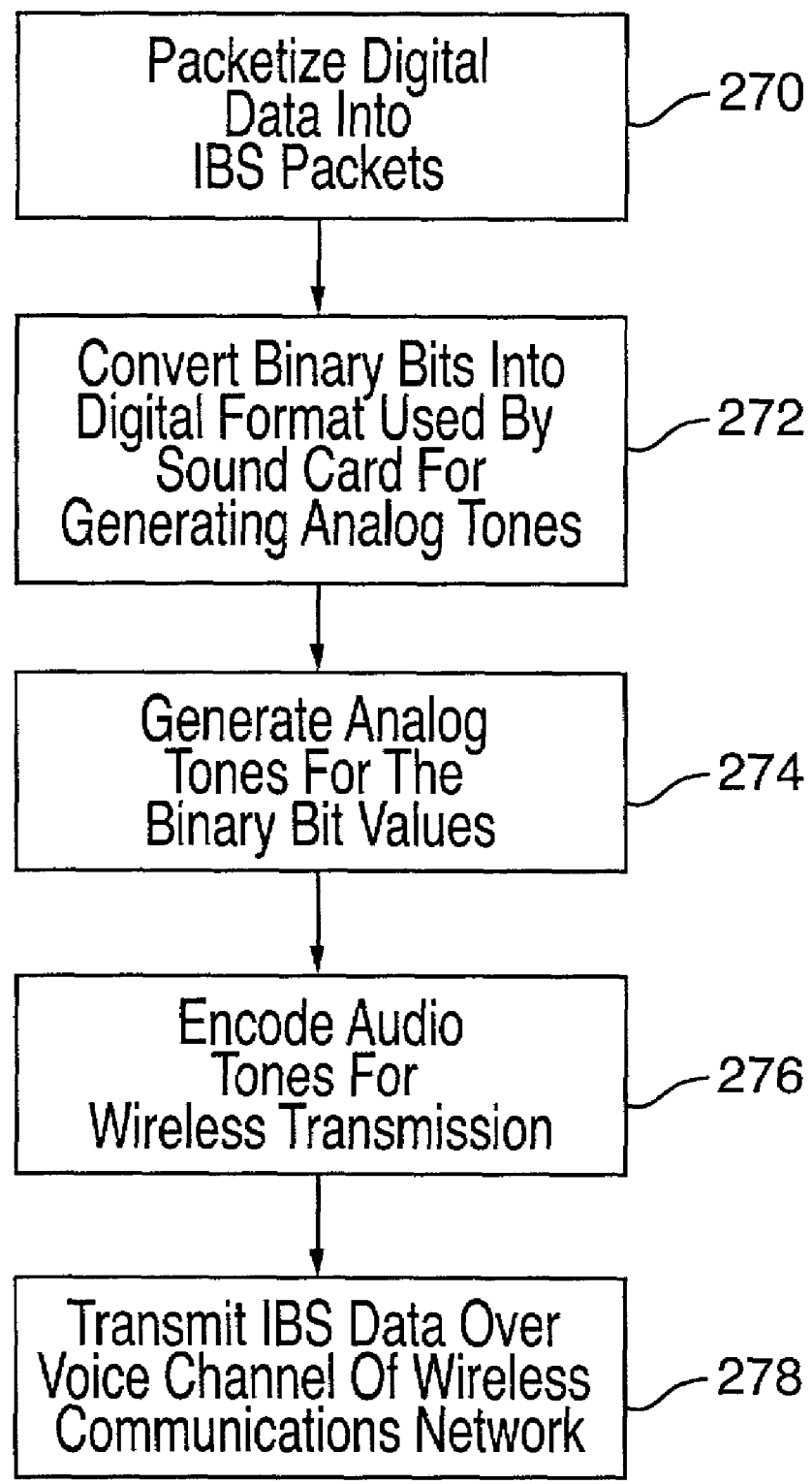
FIGS. 17 and 18 are block diagrams showing how the sound card in FIG. 16 operates.

Referring to FIGS. 16 and 17, data files, GPS data, data entered by the keyboard by a user, or any other digital data is packetized and formatted by computer 250 into IBS packets in block 270. Packetization and packet formatting is described in FIGS. 4 and 5. The binary bit values in the IBS packets are converted in block 272 into a digital format used by the sound card 252 (FIG. 16) for generating synthesized audio tones. For example, binary "1" bit values in the IBS packet are converted into a digital format representing a first f1 frequency tone and binary "0" bit values are converted into a second f2 frequency tone. The f1 and f2 tones are generated similar to the manner described in FIG. 6.

The sound card in block 274 outputs analog tones representing the binary bit values in a manner similar to the IBS encoder 52 and the digital to analog converter 54 described in FIG. 3. The cell phone in block 276 encodes the audio tones and transmits the encoded audio tones over the voice channel in the wireless communications network in block 278.

Figure 18:
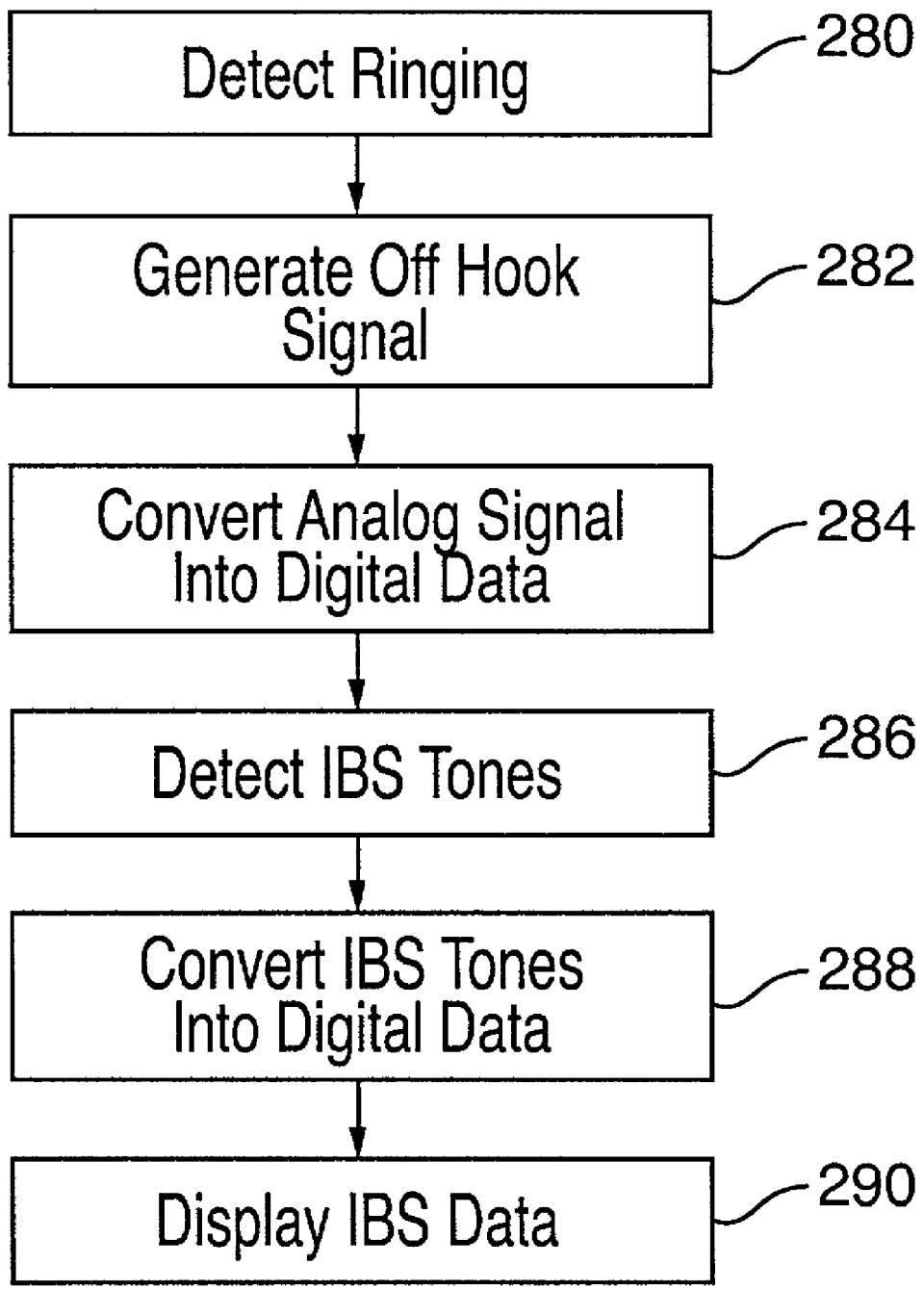

Referring to FIGS. 16 and 18, the cellular phone call is established with a destination phone number. In block 280, either a user picks up the ringing phone line or the computer 262 (FIG. 16) at the destination end of the cellular phone call is programmed to detect a ringing signal from the telephone line 260. If a ring signal is detected, either a user or the computer 262 in block 282 generates an "hook-off" signal on the telephone line 260. The sound card 264 in block 284 acts like an analog to digital converter by converting the audio tones on the telephone line 260 into digital data. The sound card 264 in conjunction with the processor 266 (FIG. 16)

decodes the IBS audio tones similar to the IBS decoder 98 described in FIGS. 9–13. The digital representations of detected IBS tones are then displayed on the screen of computer 262 in block 290.

In one example, a user wants to find the location for cell phone 258. The user directs computer 262 (FIG. 16) to dial the phone number for cell phone 258. The computer 262 uses the sound card 264 to send IBS tones that direct cell phone 258 to send back GPS location data. The computer 250 may have a GPS receiver or the cell phone 258 may have a standalone GPS receiver. If the GPS receiver and the IBS modem are internal to the cell phone 258 as shown in FIGS. 2–9, the computer 250 does not need to be connected to the cell phone 258.

The GPS data is converted into IBS tones either by the sound card 252 as described in FIG. 17 or through an internal IBS modem as described in FIGS. 2–9. The IBS tones representing the GPS data are transmitted back over the wireless telecommunications channel and the PSTN network 263 to the telephone line 260. The sound card 264 in computer 262 monitors the phone line 260 for the IBS audio tones. When detected, the IBS tones are converted back into digital GPS data and displayed by processor 266 to the user on the screen of computer 262. A mapping process in the computer 262 may then convert the GPS longitude and latitude values into a state, city and street address.

Synchronization

Figure 19:
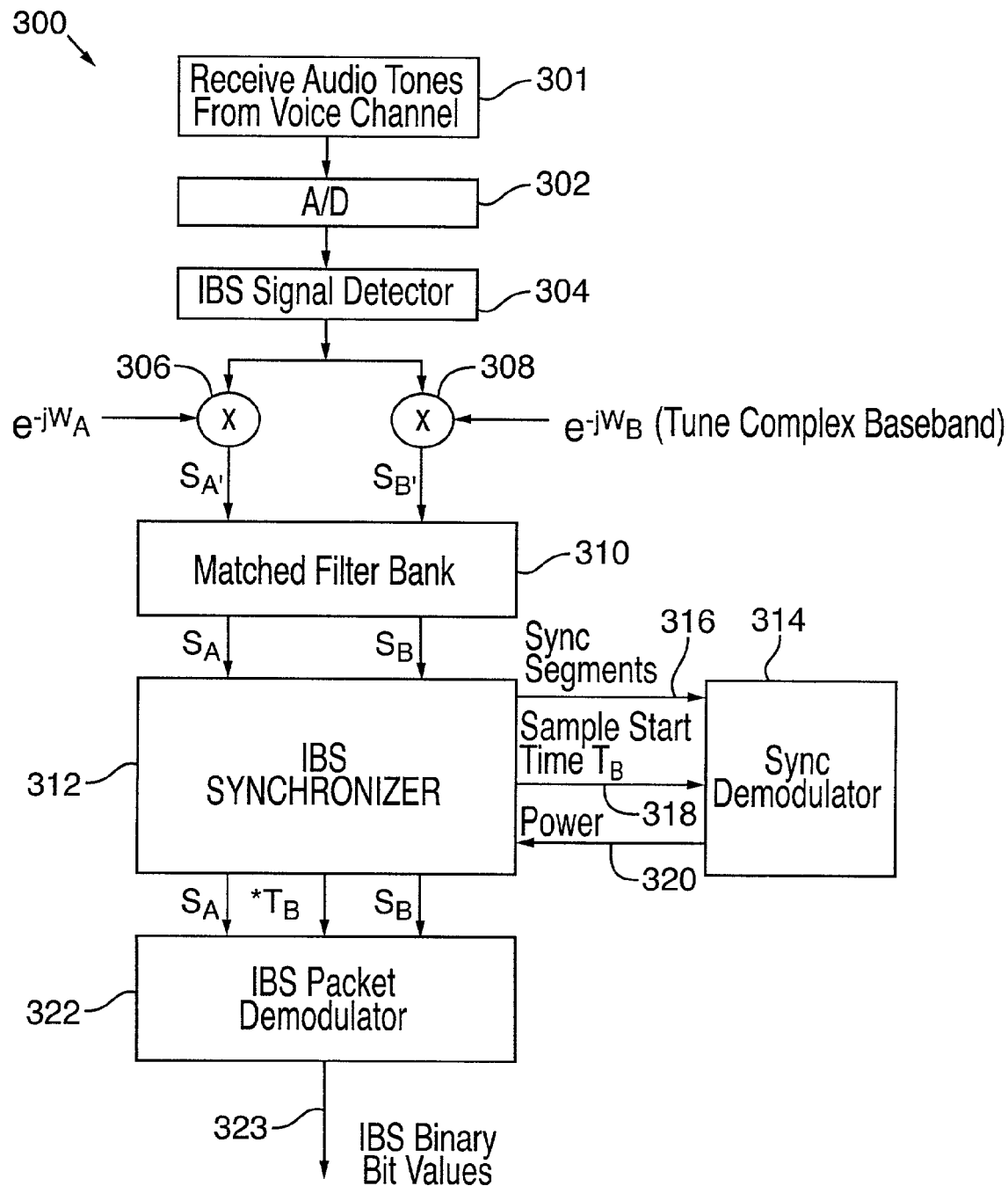
FIG. 19 is a block diagram of a synchronization circuit for the IBS modem.

FIG. 19 shows an alternative technique for demodulating and synchronizing the IBS modem in the IBS decoder 300. The IBS audio tones are received over the voice channel of the wireless communications network at interface 301. The received tones are converted from analog to digital form by A/D converter 302. The IBS signal detector 304 detects the presence of the IBS audio tones in the same manner as described in FIG. 11.

The alternative synchronization technique begins with the decoder 300 tuning the IBS signals to complex basebands with multipliers 306 and 308. Multiplier 306 effectively moves any IBS tones at the first and second IBS frequencies f1 and f2 to DC. This first baseband signal is referred to as $S_A'$ and the second baseband signal is referred to as $S_B'$. A matched filter bank 310 applies matched filters to the baseband signals having the expected pulse shapes for the two audio tones representing the binary "1" and binary "0" values. The $S_A$ signal output from the matched filter bank 310 represents a binary 1 value and the $S_B$ signal represents a binary 0 value. The matched filter bank can also add filtering to account for known characteristics of the wireless communications channel that may exist in the $S_A$ or $S_B$ signals.

The matched filter is selected to match the pulse shaping applied to the modulator. The pulse shaping is selected for the best trade-off between signaling bandwidth, bit rate and inter symbol interference. The pulse shaping filter is applied to the integrated phase of the modulator's numerical oscillator.

An IBS synchronizer 312 aligns the modulator with the synchronization pattern attached to the front of the IBS packet. Segments 316 of samples from the $S_A$ and $S_B$ signals are input to synchronization demodulator 314 along with a sample start time $T_B$. The demodulator 314 outputs a power value 320 to the IBS synchronizer 312 that indicates how closely the demodulator is synchronized with the beginning bit in the synchronization pattern. The IBS synchronizer 312 uses the power values 320 for each sample start time $T_B$ to determine the optimum synchronization start time ($*T_B$) for demodulating the remaining bits in the IBS packet. IBS packet modulator 322 then uses the optimum start time $*T_B$ to demodulate the binary bit values from the $S_A$ and $S_B$ signals.

Figure 20:
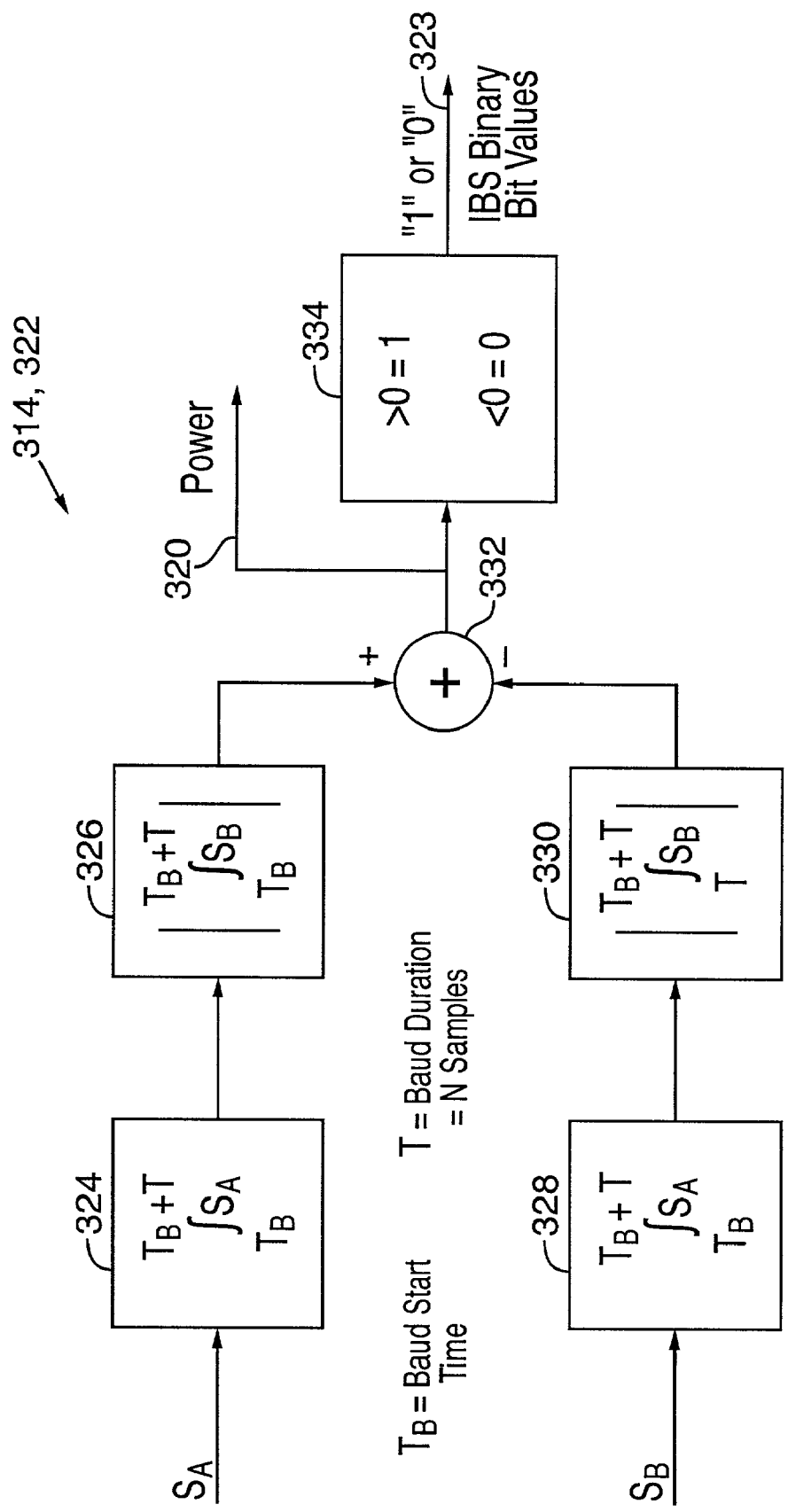
FIG. 20 is a detailed diagram of the synchronization circuit in FIG. 19.

FIG. 20 is a more detailed description of the sync demodulator 314 and the IBS packet demodulator 322 in FIG. 19. A first integrator 324 integrates the first segment of samples for the $S_A$ signal. The integrator starts at sample start time $T_B$ and integrates N number of samples representing the duration T of one IBS bit (Baud time). A rectifier 326 feeds the magnitude of the integration value into an adder 332. In a similar matter, an integrator 328 integrates the segments of samples for signal $S_B$ starting at sample start time $T_B$. A rectifier 330 feeds the magnitude of the integrated segment of the $S_B$ signal into adder 332. The output of adder 332 is a power signal 320 that is fed back to the synchronizer 312. The IBS packet demodulator 322 (FIG. 19) also includes a comparator 334 that generates either a binary 1 value or a binary 0 value according to the magnitudes of the $S_A$ and $S_B$ signals.

To explain further, FIG. 21 shows a representation of the signals $S_A$ and $S_B$ that are output from the matched filter bank 310. A number of samples 336 of the $S_A$ or $S_B$ signal represent the bit duration T of one IBS tone. In the example shown in FIG. 21, five samples are taken for each bit duration T. The sample start time $T_B$ is shifted one sample for each integration. A starting sample for the first integration starts at sample start time $T_{b1}$. As seen in FIG. 21, the sample start time $T_{b1}$ is not aligned with the $S_A$ signal representing a binary "1" value or the $S_B$ signal representing a binary "0" value. The sync demodulator 314 in FIG. 20 generates a power output value of 0.0 for $T_{b1}$.

When sample start time $T_{B2}$ is used, the demodulator 314 generates an output value of –2.0. The sample start time $T_{B3}$ represents the sample with the best synchronization with the beginning of the "0" tone in signal $S_B$. At synchronization start time $T_{B3}$ the output power is –3. As the sample start times $T_{B4}$ and $T_{B5}$ move further away from the best synchronization position, the magnitude of the output power decreases. FIG. 22 shows the magnitude of the power distribution for the different sample start times. The maximum power magnitude is identified at sample start time $T_{B3}$. Thus, the optimal sample start time $T_{b3}$ is used by the IBS synchronizer 312 (FIG. 19).

Referring to FIGS. 20 and 21, a first sampling segment 338 starting at sample time $T_{b3}$ generates an output value from adder 332 in FIG. 20 of –3. The comparator 334 in FIG. 20 generates a binary "0" value for any adder value less than zero. The output of adder 332 for a second segment of sample values 340 generates an output value of +3. Because the output value for the second sample segment is greater than 0, comparator 334 generates a binary "1" value. The IBS packet demodulator 322 (FIG. 19) continues to decode the tones in the $S_A$ and $S_B$ signals for the remainder of the IBS bit stream.

Figure 23:
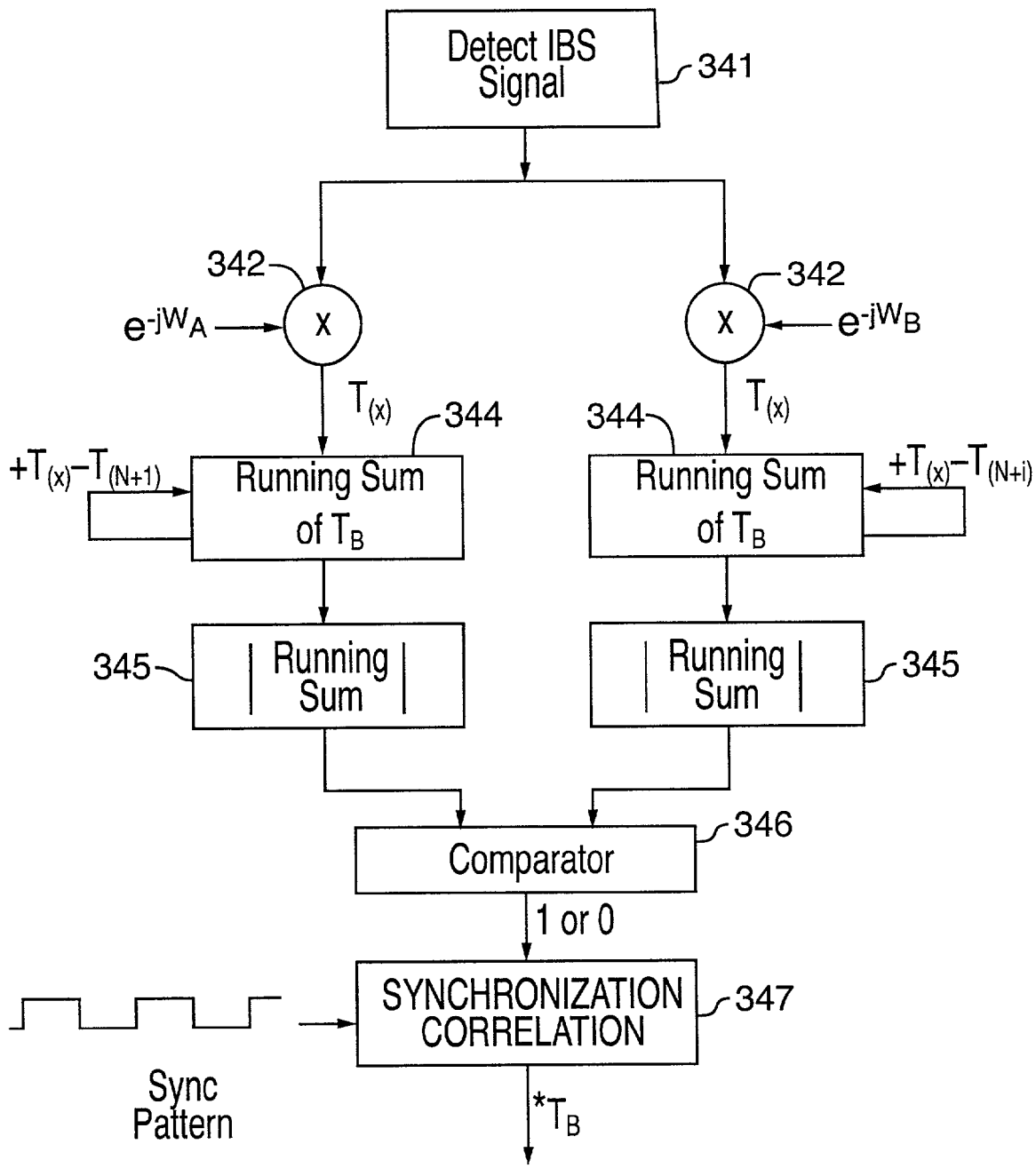
FIG. 23 is an alternative implementation of the synchronization circuit.

FIG. 23 shows a variation of the synchronization scheme described in FIGS. 19–22. The IBS tones are detected in block 341. The IBS tones are shifted to baseband by the multipliers 342 for both the audio tone frequency $f_A$ representing a binary bit "1" value and for the audio tone $f_B$ representing a binary bit "0". The baseband shift is done for each individual sample T(x) of the $f_A$ and $f_B$ signals Instead of summing an entire baud of samples, a running sum of the latest baud value is taken using the new sample T(x) in block 344. For example, with a sample rate of 20 samples per bit, the $21^{st}$ sample T(N+1) is deleted from the running sum and the next sample T(x) is added to the running sum. The magnitude of the two running sums for tone A and tone B are each taken in blocks 345 and compared by comparator 346. A binary "1" or binary "0" value is output from comparator 346 depending upon which of the A tone or B tone samples has the largest magnitude value. The binary bit values output from comparator 346 are correlated with the known sync pattern in the correlation block 347. The selected sample start time $*T_B$ is identified as the last sample that generates the largest correlation value with the synchronization pattern. The remaining bits in the IBS packet are then demodulated according to the selected sample start time $*T_B$.

Multichannel Inband Signaling Modem

Figure 24:
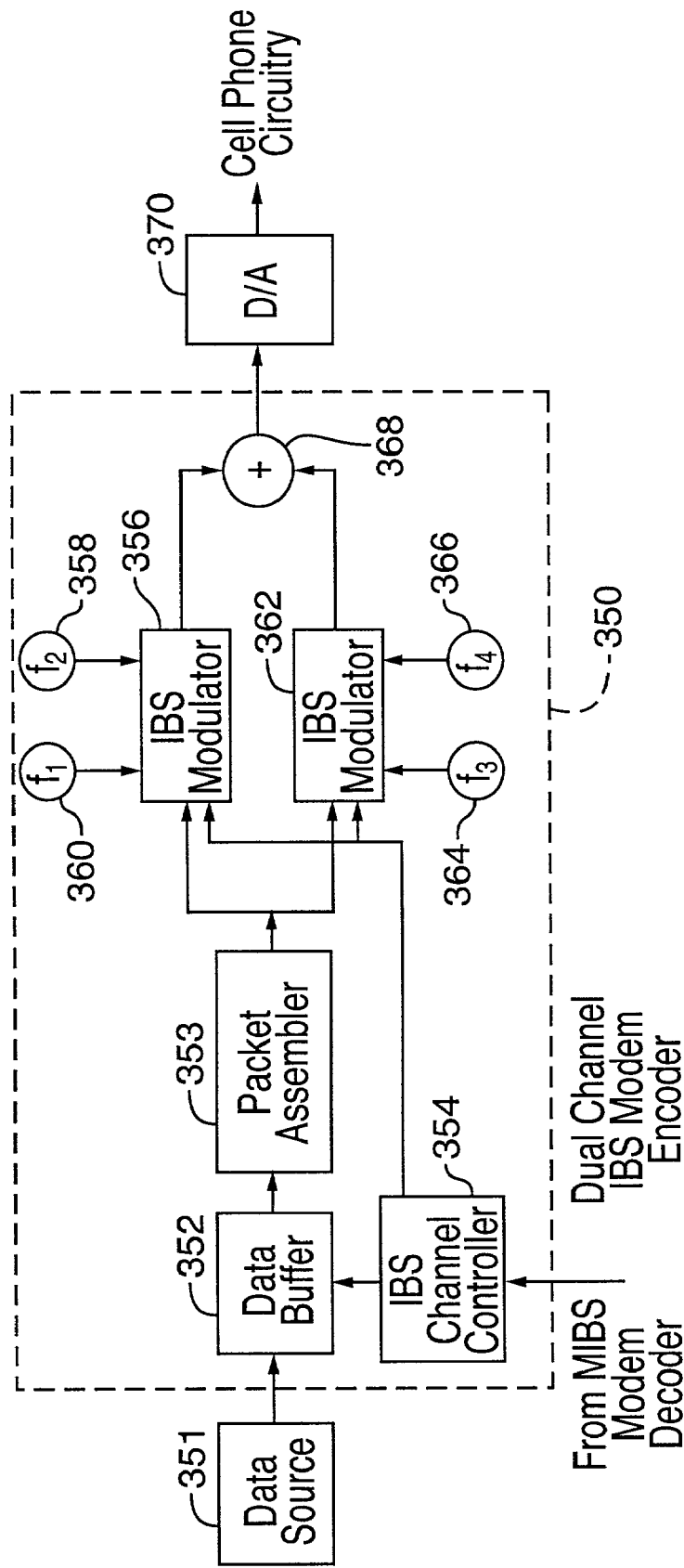
FIG. 24 is an encoder diagram for a multichannel IBS modem.

FIG. 24 shows the encoder portion 350 of a Multichannel Inband Signaling (MIBS) modem. A data source 351 generates a binary bitstream. The MIBS encoder 350 generates multiple inband signaling channels within the same voice channel. A data buffer 352 stores the binary bit stream from the data source 351. A packet assembler 353 assembles the bits in buffer 352 into a packet payload and adds a preamble and postamble to the packet payload to form IBS packets as described above in FIG. 4.

The encoder 350 includes two modulators 356 and 362 that each generate different audio tones that represent the bits in the IBS packets. Modulator 356 modulates binary "1" values using an f1 frequency 360 and modulates binary "0" values using an f2 frequency 358. Modulator 362 modulates other bits in the IBS packets having binary "1" values using an f3 frequency 364 and modulates binary "0" values using an f4 frequency 366. The f1 and f2 tones output from modulator 356 are referred to as a first Inband Signaling channel and the f3 and f4 tones output from modulator 362 are referred to as a second IBS channel. The tones output from the two modulators 356 and 362 are combined together by an adder 368 and then output to the D/A converter 370 and other cell phone circuitry 14 (FIG. 2). The cell phone circuitry 14 encodes and transmits the tones in the two IBS channels over an audio channel of the cellular telephone network.

Each of the individual modulators 356 and 366 are similar in operation to the IBS modulator 64 shown in FIG. 4. Any number of IBS channels can be generated in the IBS modem 24. For example, a third IBS channel could be provided by adding a third IBS modulator that modulates bits for a third portion of the IBS packets into tones using frequencies f5 and f6. The output of the third IBS modulator would be fed into the adder 368. However, for simplicity, only a two channel IBS modem with two corresponding IBS modulators 356 and 362 are shown in FIG. 24.

An IBS channel controller 354 controls how the multiple IBS channels are utilized by the transmitting and receiving IBS modems. For example, a first IBS channel may only be used by a first IBS modem for transmitting IBS packets and a second IBS channel may only be used by that first IBS modem for receiving IBS packets. A second IBS modem on the opposite end of the transmission then uses the second IBS channel for transmission and uses the first IBS channel for reception. The IBS channel controller 354 adds control bits into the IBS packets that negotiate use of the multiple IBS channels between the two communicating IBS modems. The different configurations for the IBS modems are described in further detail below in FIGS. 26 and 27. The controller 354 also controls what portions of the IBS packets are modulated by modulators 356 and 362. For example, the modulators may modulate every other IBS packet or each modulator may modulate different portions of the same IBS packets.

Figure 25:
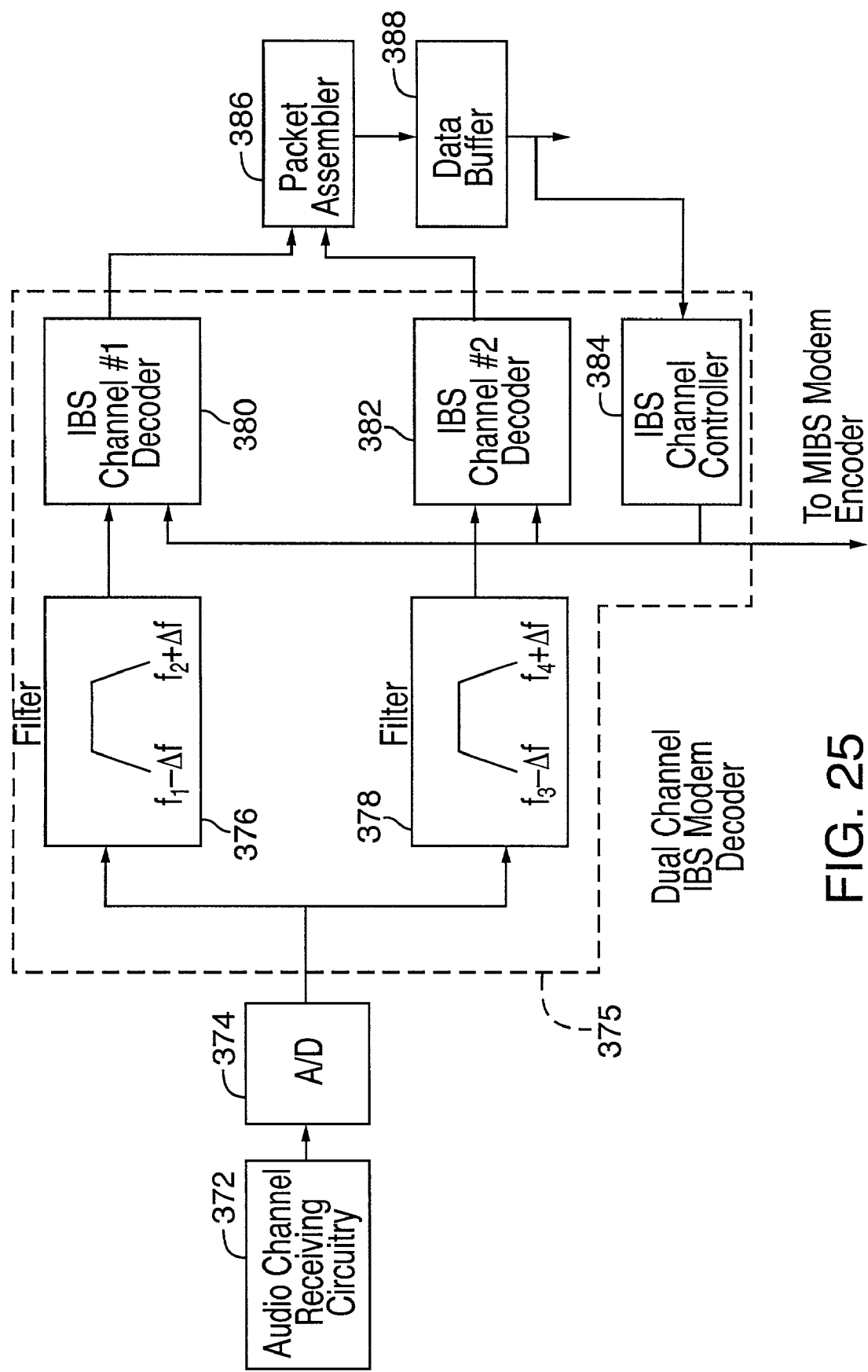
FIG. 25 is an decoder diagram for a multichannel IBS modem.

FIG. 25 shows the decoder 375 of the MIBS modem. The audio tones from the audio channel are decoded by receiving circuitry 372 and fed into an A/D converter 374. A first filter 376 filters signals outside a frequency range of the two tones in the first IBS channel and a second filter 378 filters signals outside the frequency ranges of the two tones in the second IBS channel. The frequency range of filter 376 is from f1−Δf to f2+Δf and the frequency range of filter 378 is from f3−Δf to f4+Δf. The filters 376 and 378 are shown before the decoders 380 and 382, respectfully. However, the filters 376 and 378 can be implemented in the same DSP anywhere in the decoding process.

A first IBS channel decoder 380 detects and demodulates the two tones in the first IBS channel into binary bit values and a second IBS channel decoder 382 detects and demodulates the two tones in the second IBS channel into binary bit values. The decoders 380 and 382 detect, synchronize, and demodulate the IBS tones in the same manner as previously described for decoder 98 in FIG. 9 or decoder 300 in FIG. 19. A packet assembler 386 assembles the bits output from the two decoders 380 and 382 into IBS packets that are then output to a data buffer 388.

The IBS channel controller 384 in the receiving IBS modem synchronizes the two decoders 380 and 382 and determines which decoders demodulate what portions or which IBS packets. The controller 384 also conducts a communication protocol with the transmitting IBS modem that negotiates which IBS modem is transmitting and which IBS modem is receiving IBS packets over which IBS channels.

The filter 376 and decoder 380 for the first IBS channel and the filter 378 and decoder 382 for the second IBS channel can be implemented in software in the same DSP. Alternatively, one DSP can be used for each individual channel encoder and decoder in each MIBS modem.

It is preferred in the "MIBS" modem for frequencies f1 & f2 to be far apart from frequencies f2 and f3. One advantage of MIBS is interference mitigation and the ability to adapt to variations in cell phone performance across manufacturers by dynamically changing frequencies when performance is bad. A robust low baud rate control signal can be sent to choose a new frequency when one modem is detecting errors.

Figure 26:
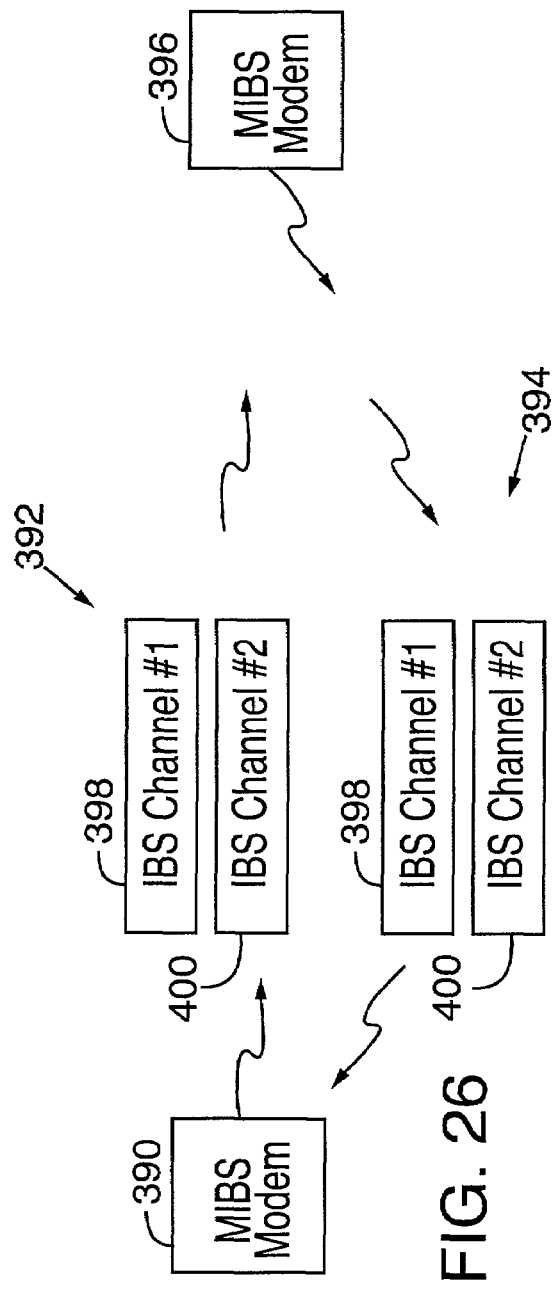
FIGS. 26 and 27 show different channel configurations for the multichannel IBS modem shown in FIGS. 24 and 25.

FIG. 26 shows one possible configuration for two Multichannel Inband Signaling (MIBS) modems 390 and 396. The two IBS channels 398 and 400 are transmitted from MIBS modem 390 over the voice channel of a wireless communications network and then possibly through a landline telephone network to the MIBS modem 396. The two MIBS modems shown in FIG. 26 operate in a half duplex mode where one of the IBS modems transmits IBS packets over both the first IBS channel 398 and the second IBS channel 400 at the same time.

After the first IBS modem 390 has completed a transmission 392 of IBS packets over the two IBS channels, the second IBS modem 396 is allowed to begin a transmission 394 back to modem 390 over the two IBS channels 398 and 400. The MIBS modem 390 sends information in one of the IBS packets indicating to the MIBS modem 396 that the transmission 392 is completed.

Figure 27:
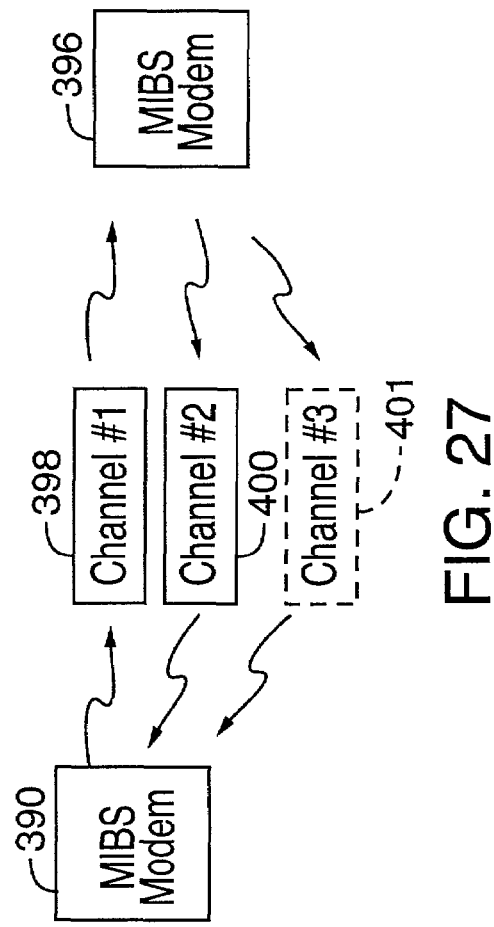

FIG. 27 shows an alternative configuration where the first IBS channel 398 is dedicated to transmitting IBS packets from MIBS modem 390 and the second IBS channel 400 is dedicated to transmitting packets from MIBS modem 396. Thus, both MIBS modem 390 and 396 can transmit and receive packets at the same time. This full duplex configuration can provide faster communications for certain types of IBS transmissions.

The MIBS modem 390 may transmit different potions of the same IBS packets over the two IBS channels 398 and 400 or may alternate transmission of different IBS packets over the two IBS channels. In other configurations, one IBS channel may be used for transmitting IBS packets and the second IBS channel may be used exclusively for signaling and protocol communications between the two MIBS modems. In other alternative configurations, portions of bits from the same IBS packets are interleaved in the two IBS channels or the same IBS packets are transmitted over both IBS channels for redundancy. The information in the two IBS channels can be reconfigured according to the application associated with IBS packet data.

A request to reconfigure the IBS channels can be encoded into the IBS packet header. For example, the IBS channel controller 354 (FIG. 24) in MIBS modem 390 may send an IBS packet to MIBS modem 396 that contains a reconfiguration request in the IBS packet preamble 73 (FIG. 5). The reconfiguration request from modem 390 may request both the first IBS channel 398 and the second IBS channel 400 and then request allocation of a third IBS channel 401, with a slower baud rate, to MIBS modem 396 for transmitting acknowledge messages back to modem 390. MIBS modem 390 then waits for an acknowledge of the configuration request from modem 396.

The IBS channel controller 384 (FIG. 25) in MIBS modem 396 reads the reconfiguration request in the IBS packet preamble. The controller 384 then outputs an acknowledge back through the encoder of MIBS modem 396. The encoder formats the acknowledge into the preamble of a reply IBS packet that is then modulated and transmitted back to MIBS modem 390 over one or more of the currently allocated IBS channels. The controller in the modem 396 then reconfigures the encoder to receive IBS packets over the first and second IBS channels 398 and 400 and transmit packets over the third low baud rate channel 401.

When the acknowledge from modem 396 is received at modem 390, the controller directs the encoder and the decoder in the modem 390 to transmit over the first and second IBS channels and receive from the low baud rate third channel. The two modems 390 and 396 then transmits and receive IBS packets according to the new channel configuration.

Multicarrier Inband Signaling Modem

Figure 28:
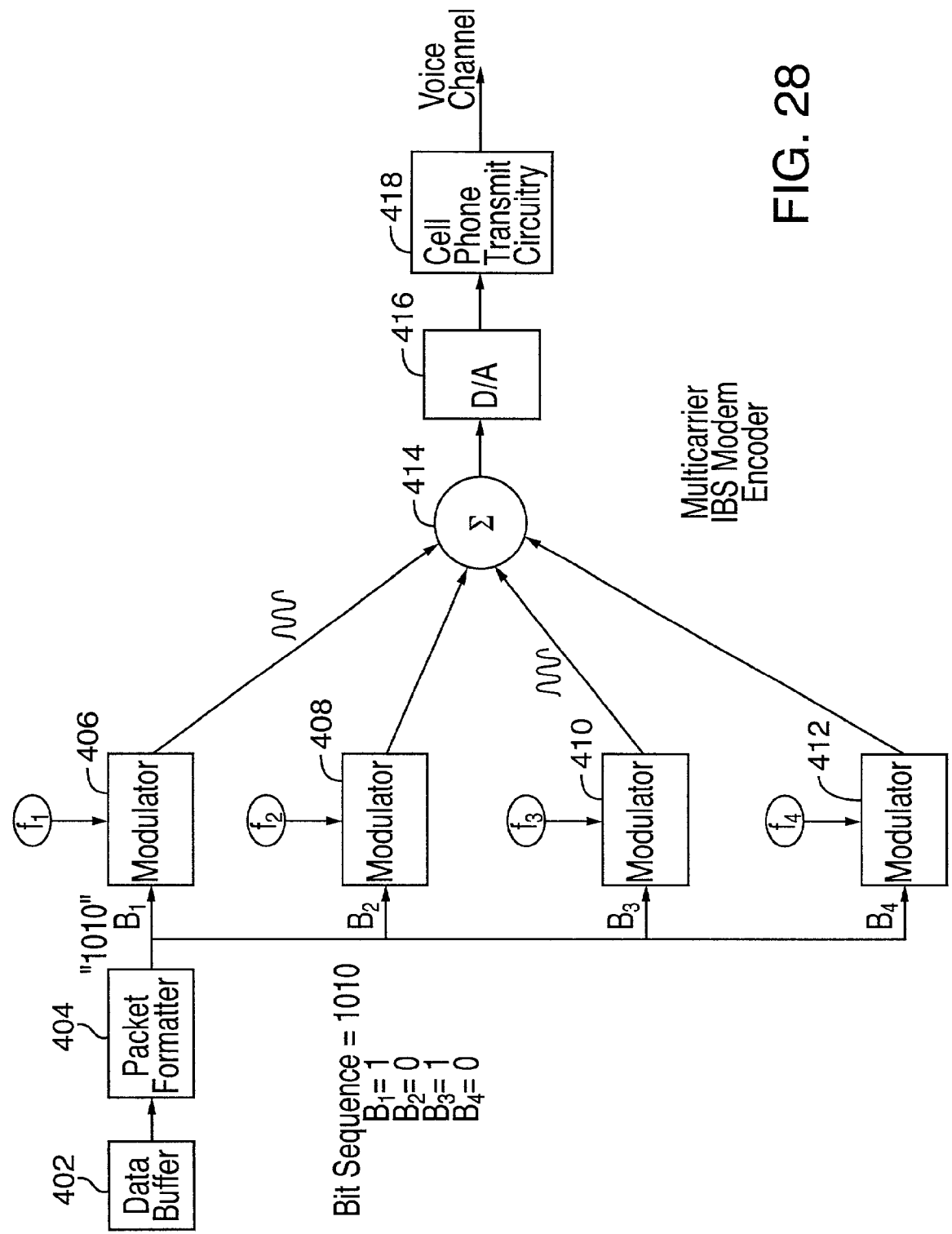
FIG. 28 is an encoder diagram for a multicarrier IBS modem.

FIG. 28 shows a Multicarrier Inband Signaling modem according to another aspect of the invention. The multichannel IBS modem described in FIGS. 24–27 generates two different audio tones, one tone representing a binary "1" value and a second tone representing a binary "0" value. The two tones are generated in a sequential tone stream over time to represent a binary bit stream.

The multicarrier IBS modem in FIG. 28 generates multiple audio tones at the same time, where each tone represents a different bit location in a four bit portion of the IBS packet. The particular audio tone associated with one of the four bit locations represents a binary "1" value (or alternatively a binary "0" value). If the audio tone is not generated for a particular bit time (baud), the IBS decoder assumes the binary bit value associated with that bit location is "0".

Referring to FIG. 28, a stream of bits are input to data buffer 402 for transmission over the audio channel of a wireless communications network. A packet formatter 404 formats those bits into an IBS packet. A first portion of one of the IBS packets contains the bits "1010". The packet formatter 404 outputs each one of the four bits into a different one of the four modulators 406, 408, 410 and 412. The first bit "1" of the four bit sequence is referred to as bit B1, the second bit "0" is referred to as bit B2, the third bit "1" of the four bit sequence is referred to as bit B3, and the fourth bit "0" is referred to as bit B4.

Modulator 406 receives bit B1, modulator 408 receives bit B2, modulator 410 receives bit B3, and modulator 412 receives bit B4. Because bit B1 is a binary "1" value, modulator 406 generates a tone at frequency f1 during the first baud period. The modulator 408 does not generate an f2 tone for the first baud period because the B2 bit is a binary "0" value. Accordingly, modulator 410 generates a f3 tone during the first baud period and modulator 412 does not generate a f4 tone during the first baud period. The modulators work in essentially the same manner as the IBS modulator 64 in FIG. 4 except that a frequency tone is generated for the binary "1" values and no tone is generated for the binary "0" value.

The f1 and f3 tones are combined together by summer 414. A digital to analog converter 416 converts the digital signal into an analog signal that is fed into cell phone transmit circuitry 418. The transmit circuitry 418 transmits the audio tones over the voice channel of the cellular telephone network.

Figure 29:
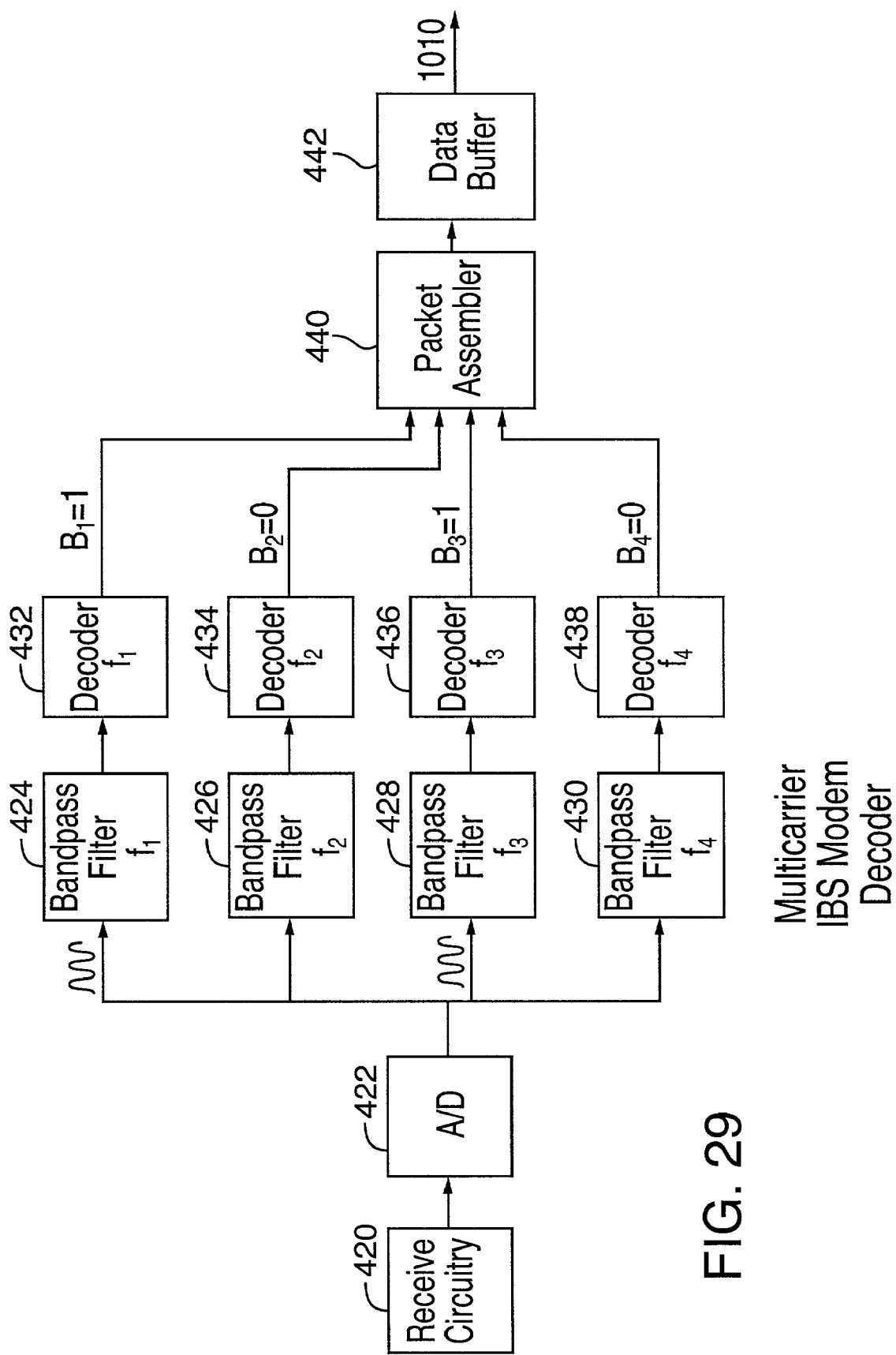
FIG. 29 is an decoder diagram for a multicarrier IBS modem.

FIG. 29 shows the decoder for the multicarrier IBS modem. Receive circuitry 420 receives the IBS tones from the voice channel of the cellular communications network. An A/D converter 422 converts the audio tones into a digital signal. Four bandpass filters 424, 426, 428 and 430 each are centered about the frequency for the tones f1, f2, f3, and f3, respectively. The tone representing the binary bit B1 passes through bandpass filter 424 while other tones, such as tone f3, are filtered by the bandpass filter f1. Decoder 432 identifies the tone f1 in a manner similar to the IBS decoder described in FIGS. 11–13, only for a single tone. Because the f1 tone was detected by decoder 432, a binary "1" value is generated representing bit B1 in the four bit sequence.

Because no f2 tone will be detected by decoder 434, a binary "0" value is generated for bit B2 in the four bit sequence. Decoder 436 detects an f3 tone and accordingly generates a binary "1" value for bit B3. Decoder 438 generates a binary "0" value for bit B4 because no f4 tone was generated by the multicarrier encoder. A packet assembler 440 receives the four bits B1–B4 and places them into the appropriate IBS packet location in the data buffer 442.

Clock Synchronization Using IBS Demodulator

Figure 30:
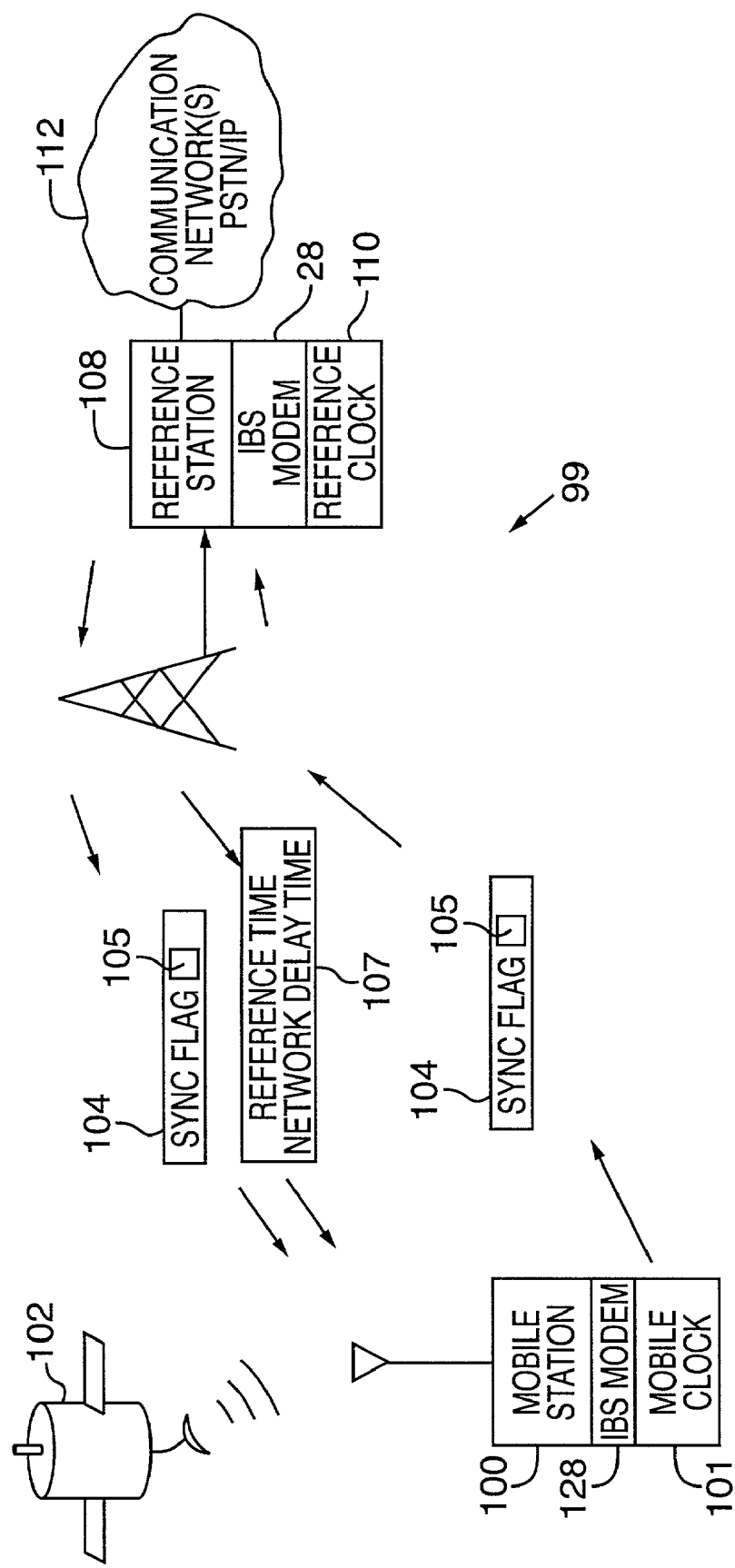
FIG. 30 is a diagram of a communication system that synchronizes clocks using a synchronization flag.

Referring to FIG. 30, a communications network 99 includes a mobile station 100 that includes a mobile clock 101. The mobile station 100 in one embodiment is a cellular telephone, or other type of mobile device, that includes a Global Positioning System (GPS). The mobile station 100 receives global positioning data from satellite 102. The mobile station 100 receives position data from the satellite 102 and transmits the position data to a reference station 108. The reference station 108 may then forward the location data to another destination in a communications network 112. The communications network 112 can include a Public Services Telephone Network (PSTN) and an Internet Protocol (IP) network.

The reference station 108, or some other location in the communications network 112, includes a reference clock 110. Wireless radio communications between the mobile station 100 and the reference station 108 may use either analog or digital signaling. The reference station 108 and the mobile station 100 may transmit data or voice signals.

A synchronization flag (sync flag) 104 is used to synchronize the mobile clock 101 in the mobile station 100 with the reference clock 110 at reference station 110. The sync flag 104 contains a sequence of bits that are identified by the mobile station 100. The sync flag 104 is received by the mobile station 100 then sent back to the reference station 108.

The sync flag 104 includes a reference bit 105 associated with a specific time when the sync flag was transmitted. After the synchronization flag 104 is returned by the mobile station 100 back to the reference station 108, the IBS modem 28 in reference station 108 synchronizes with the returned sync flag 104 in one of the ways described in FIG. 13 or FIGS. 19–23. The reference station 108 then identifies a final time associated with the returned reference bit 105.

By first synchronizing the IBS modem 28 with the sync flag 104, the reference station 108 can more accurately determine the network delay in communications system 99. The round trip delay is defined as an amount of time required for the sync flag 104 to go from reference station 108, to mobile station 100 and back to reference station 108. The round trip delay is divided by two to derive the one-way network delay time. The network delay time can then be subtracted from a reference time 107 by either the mobile station 100 or the reference station 108 to compensate for network delay. The mobile station 100 uses the adjusted reference time to update the mobile clock 101. Depending on the application, the IBS modem 28 in the mobile station 100, or the IBS modem 28 in reference station 108, or both, may synchronize with the sync flag 104 and determine a reference time according to the reference bit.

Figure 31:
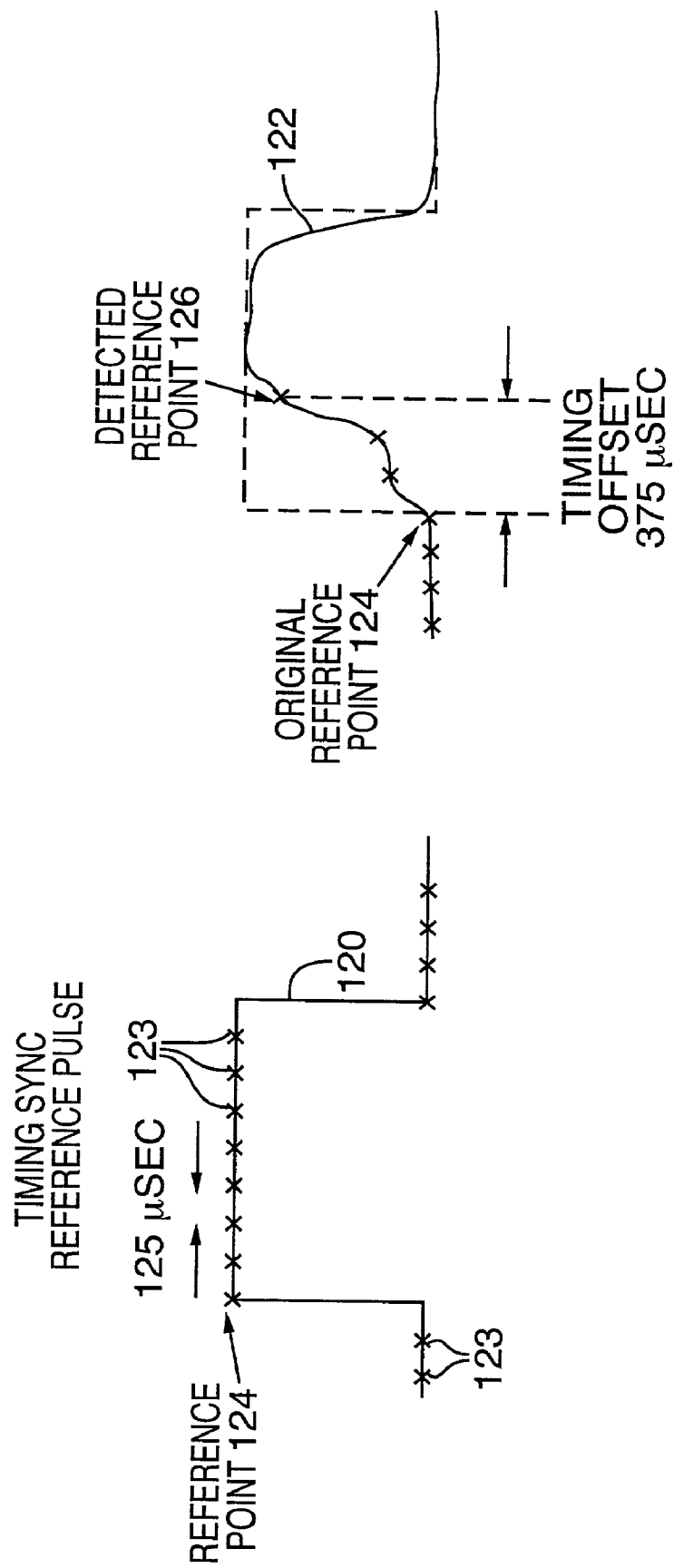
FIG. 31 shows a graph of a single timing pulse used for synchronizing a remote clock.

FIG. 31 shows a single synchronization pulse 120 used for calculating network delay. Network delay is determined by calculating the amount of time required for the pulse 120 to go from the reference station, to the mobile station and then back at the reference station.

The problem with using a single reference pulse 120 is that the pulse may be distorted by encoding and decoding circuitry in the communications network. In one particular application, the reference pulse 120 is transmitted over the same channel in the communications network used for transmitting and receiving voice signals. In this application, a voice codec may filter out or further corrupt the reference pulse 120.

A reference pulse 122 shows one example of distortion. Because pulse 122 is distorted, the mobile station and/or the reference station cannot accurately determine when the pulse 122 is received. This prevents an accurate determination of the network delay and prevent accurate synchronization of the mobile clock with the reference clock.

To explain further, a number of samples 123 are taken by the reference station of the reference pulse 120. The sample rate may be some value such as 125 microseconds. A detected transition in the pulse 120 from a zero value to some threshold value, is identified as reference point 124. The reference point 124 is used by the reference station to calculate the network delay time.

If the pulse 120 is corrupted, as shown by pulse 122, then the detected reference point 126 may shift in time from the originally transmitted reference point 124. Because the initial portion of the pulse 122 is corrupted., the detected reference point 126 is offset 3 sample locations from the original reference point 124. This results in a 125 microsecond/sample×3 samples=375 microsecond timing offset. This timing offset reduces the precision of the calculated round trip delay time.

Figure 32:
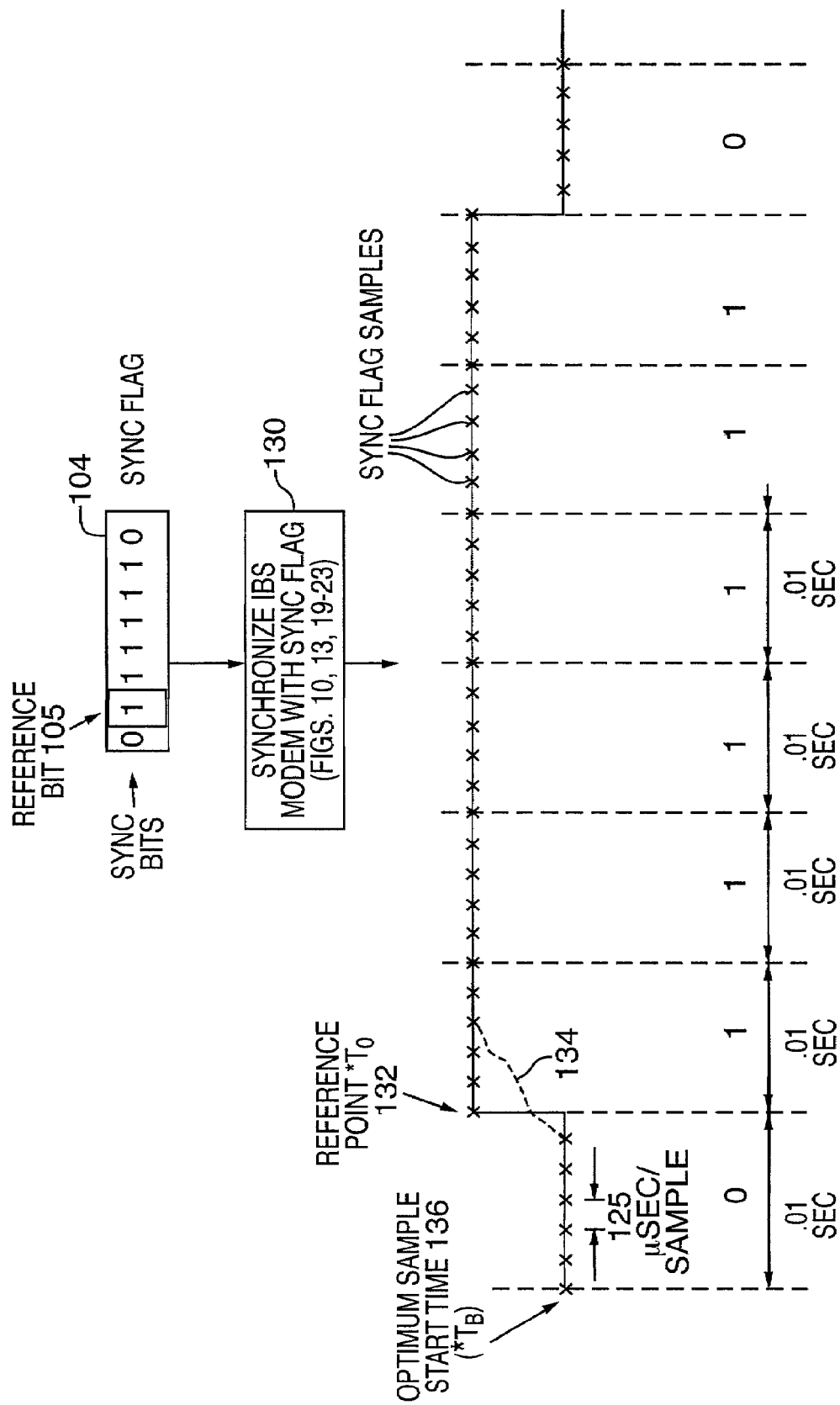
FIG. 32 shows a graph of a synchronization flag used for synchronizing a remote clock.

FIG. 32 shows how the sync flag 104 prevents signal corruption from effecting the detected reference point and, in turn, effecting the calculated network delay time. Instead of transmitting a single reference pulse 120 (FIG. 31), a sequence of sync bits are transmitted in the sync flag 104. One of the bits in the sync flag 104 is used as the reference bit 105. An initial start time $T_o$ for the reference bit 105 is tracked by the reference station. In the example shown in FIG. 32, the transition from a "0" bit to the first "1" bit in the sync flag 104 is selected as the To reference point 132.

Instead of simply looking for a single signal threshold change in a single reference pulse as shown in FIG. 31, the IBS modem first synchronizes with the entire sync flag 104 as shown by block 130. Several implementations of this modem synchronization are described in FIGS. 10, 13 and 19–23. The modem synchronization shifts a sample start time 136 for the entire sync flag 104 until an optimum power ratio is generated. By identifying an optimum power ratio for the entire sync flag 104, a few corrupted samples in the sync flag 104 are less likely to adversely effect the detected location of reference point 132.

Dashed line 134 represents signal corruption in the sync flag 104. Because the IBS modem in block 130 synchronizes with multiple bits of the synchronization flag 104, the corrupted samples 134 in the synchronization flag 104 do not offset where the reference point 132 is detected. In a general case, the reference point 132 will be no more then +/− one half of the sample rate. In the example shown here, the reference point 129 will be off no more then +/−62.5 microseconds.

In one variation, multiple sync flags 104 are sent. This ensures that the mobile station will detect at least one of the sync flags 104. The reference time is adjusted according to which sync flag is used. In another aspect of the invention, different tone frequencies are generated by the IBS modem 28 to represent the binary "1" values and the binary "0" values in the sync flag 104. These tones are transmitted over the audio channel of the communications network. This is described above in FIGS. 1–29. By generating tones having frequencies within a human voice range, voice codecs in the communications network are less likely to corrupt or filter the binary bits represented by the generated tones.

The individual bits in each sync flag 104 have a sorter duration than the single synchronization pulse 120 shown in FIG. 31. This provides a better signaling environment for properly passing the bits through digital voice coders in wireless networks. Thus, using the sync flag 104 instead of using a single sync pulse further reduces signal corruption.

Figure 33:
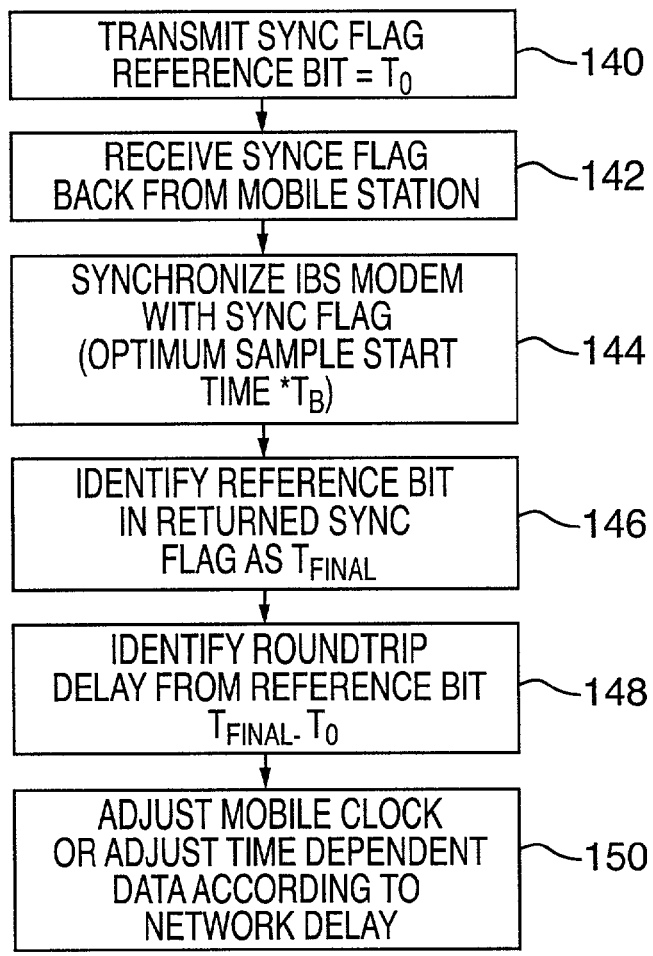
FIG. 33 is a flow diagram showing how network delay is determined using the synchronization flag.

Referring to FIG. 33, the sync flag 104 is initially sent out by the reference station in step 140. The mobile station receives the sync flag and then returns the sync flag back to the reference station in step 142. The IBS modem in the reference station synchronizes with the returned sync flag in step 144. As described in FIG. 13 and FIGS. 19–23, the IBS modem synchronizes with the sync flag by varying the sample start time ($T_B$) until the optimum power ratio for the synchronization flag is determined.

After the IBS modem is synchronized, block 146 uses the optimum sample start time (*$T_B$) to determine the time associated with reference point 132 (FIG. 32) in the sync flag. The time associated with the reference point 132 is determined by multiplying the number of samples between the optimum sample start time (*$T_B$) and the reference point 132 by the sample rate. The time from when the reference bit was originally output by the reference station ($T_0$) to when the reference bit is received back by the reference station ($T_{final}$) is the round trip delay time. Block 148 determines the round trip delay and divides the round trip delay in half to determine the one way time delay in the network (network delay). The derived network delay is used in block 150 to synchronize the mobile clock 101 (FIG. 30) or adjust any time dependant data in the network.

Figure 34:
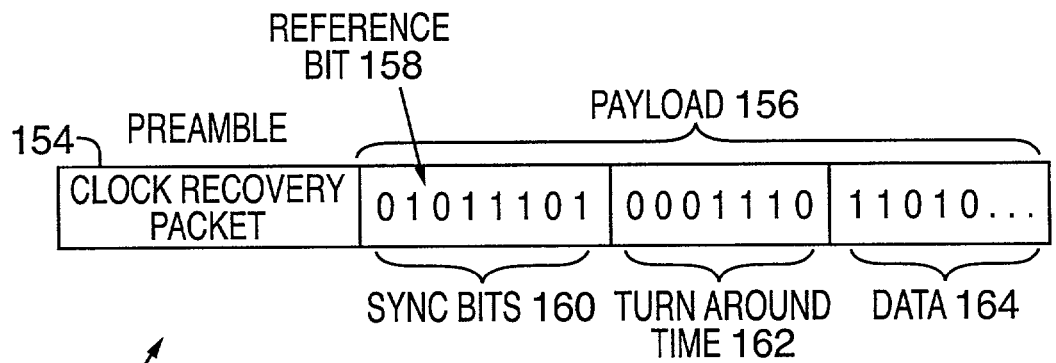
FIG. 34 is a diagram of a synchronization packet.

An alternative implementation of the sync flag is shown in FIG. 34. A data packet 152 is used for identifying network delay. A preamble 154 identifies the packet 152 as a clock recovery packet. Payload data 156 in the clock recovery packet 152 uses a preselected format and sequence of bits for modem synchronization. For example, the second bit 158 in the payload 156 is used as the reference bit. The IBS modem first synchronizes with the group of synchronization bits 160 in the payload 156. An optimum sample start time is identified for the sync bits 160. Then a reference time is determined according to the reference bit 158 in the synchronization bits 160.

Additional information can be incorporated into the packet 152 for more accurately identifying network delay. For example, a second set of bits 162 in the payload 156 identify the turn around time required by the mobile station 100 (FIG. 30) to process the synchronization packet 152. The mobile station 100 determines when the packet 152 is first received. The mobile station 100 then calculates when the packet 152 is transmitted back to the reference station 108. The time from when the packet 152 is first received by the mobile station to when the reply packet is transmitted back to the reference station is referred to as the turn around time. The turn around time 162 can be subtracted from the round trip time to more accurately determine how long it takes a packet to travel between the reference station and the remote station.

Bits can be padded in payload 156 to ensure approximately the same turn around time for each synchronization packet 152. By using the packet 152, other payload data 164 can also be carried along with the sync bits 160 and 162. The synchronization packet 152 can be incorporated into a wider variety of network protocols since the timing communications are performed at one level higher than the synchronization flag scheme described in FIG. 30.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A method for identifying network delay, comprising:
receiving tones that represent a sequence of bits, one of the bits identified as a reference bit;
sampling the tones beginning at a selected sample start time;
demodulating the tone samples to identify the bit values in a synchronization flag;
synchronizing with the tone samples by shifting the sample start time until the tone samples generate an optimum synchronization value; and
deriving a reference time according to the reference bit at the optimum synchronization value.

2. A method according to claim 1 including:
identifying an initial rime when the reference bit is first transmitted to a mobile station;
receiving the sequence of bits back from the mobile station;
synchronizing with the sequence of bits;
identifying a final time when the reference bit is received in the synchronized sequence of bits; and
denying a delay time by comparing the initial time wit the final time.

3. A method according to claim 1 wherein the tones are received over a voice channel in a wireless cellular network.

4. A method according to claim 1 including:
sampling the tones for a first frequency representing a binary 1 value;
sampling the tones for a second frequency representing a binary 0 value;
generating synchronization values by comparing the tone samples for the first frequency with the tone samples for the second frequency; and
shifting the sample start time for the tone samples for the first frequency and second frequency until the optimum synchronization value is derived.

5. A method according to claim 4 including deriving the reference rime by identifying one of the tone samples at the optimum synchronization value associated with the reference bit.

6. A method according to claim 1 including formatting the sequence of bits into a packet and synchronizing with the sequence of bits in the packet.

7. A method according to claim 6 including inserting bits in the packet that identify a turn around time representing an amount of time required to process the packer containing the sequence of bits.

8. A computer readable medium containing code executable on a processor for identifying network delay in a communications network the stored code comprising:
code for controlling the processor to receive tones that represent a sequence of bits;
code for controlling the processor to sample the tones beginning at a selected sample start time;
code for controlling the processor to demodulate the sampled tones back into bit values representing the sequence of bits;
code for controlling the processor to synchronize with the sequence of bits by shifting the sample start time until the sampled tones generate an optimum synchronization value; and
code for controlling the processor to derive a reference time according to the sample start time at the optimum synchronization value.

9. A computer readable medium containing code executable on a processor according to claim 8 including:
code for controlling the processor to identify an initial time when the sequence of bits are first transmitted;
code for controlling the processor to receive the sequence of bits back from a remote station;
code for controlling the processor to synchronize with the returned sequence of bits;
code for controlling the processor to identify a final rime according to the synchronized returned sequence of bits; and to derive a network delay time by comparing the initial time with the final time.

10. A computer readable medium containing code executable on a processor according to claim 8 wherein the tones are received over a voice channel in a network.

11. A computer readable medium containing code executable on a processor according to claim 8 including:
code for controlling the processor to sample the tones for a first frequency representing a binary 1 value;
code for controlling the processor to sample the tones for a second frequency representing a binary 0 value;

code for controlling the processor to generate synchronization values by comparing the tone samples for the first frequency with the tone samples for the second frequency; and code for controlling the processor to shift the sample start time for the tone samples of the first frequency and second frequency until the optimum synchronization value is derived.

12. A computer readable medium containing code executable on a processor according to claim 8 including:

code for controlling the processor to receive a packet having a preamble that identifies the sequence of bits; and code for controlling the processor to synchronize with the sequence of bits in the packet.

13. A computer readable medium containing code executable on a processor according to claim 12 including code for controlling the processor to insert bits in the packet that identify a turn around time representing an amount of time required to process the packet containing the sequence of bits.

14. A computer readable medium containing code executable on a processor according to claim 12 wherein the processor is disposed in a cell phone.

* * * * *